United States Patent
Hayata et al.

(10) Patent No.: US 7,713,462 B2
(45) Date of Patent: May 11, 2010

(54) INK COMPOSITION, INKJET RECORDING METHOD, PRINTED MATERIAL, AND PROCESS FOR PRODUCING MOLDED PRINTED MATERIAL

(75) Inventors: Yuuichi Hayata, Ashigarakami-gun (JP); Kazuhiro Yokoi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/237,137

(22) Filed: Sep. 24, 2008

(65) Prior Publication Data

US 2009/0087626 A1    Apr. 2, 2009

(30) Foreign Application Priority Data

Sep. 28, 2007    (JP)    ............... 2007-255543

(51) Int. Cl.
    C09D 11/00    (2006.01)
    C08J 3/28    (2006.01)
    C08F 20/24    (2006.01)

(52) U.S. Cl. ............ 264/447; 522/116; 522/120; 523/160; 526/242; 526/245; 428/195.1; 427/466

(58) Field of Classification Search ............ 264/446, 264/447; 427/551, 466; 430/270.1, 281.1, 430/286.1; 428/195.1; 522/11, 104, 113, 522/114, 124, 167, 909, 116, 120; 526/72, 526/242, 245; 523/160
See application file for complete search history.

(56) References Cited

U.S. PATENT DOCUMENTS

| 7,101,618 B2 * | 9/2006 | Coggio et al. ............ 428/336 |
| 7,105,270 B2 * | 9/2006 | Fujita et al. ............ 430/270.1 |
| 2002/0055058 A1 * | 5/2002 | Sorori et al. ............ 430/270.1 |
| 2003/0083396 A1 * | 5/2003 | Ylitalo et al. ............ 522/74 |
| 2003/0232281 A1 * | 12/2003 | Watanabe et al. ............ 430/302 |
| 2008/0254388 A1 * | 10/2008 | Takahashi et al. ......... 430/287.1 |
| 2008/0281066 A1 * | 11/2008 | Paiva et al. ............. 526/246 |

FOREIGN PATENT DOCUMENTS

| EP | 1 752 502 A1 | 2/2007 |
| EP | 1 829 682 A2 | 9/2007 |
| JP | 05-202331 A | 8/1993 |
| JP | 2880845 B2 | 1/1999 |
| JP | 2004-514014 A | 5/2004 |
| WO | 02/38688 A2 | 5/2002 |
| WO | 03/010249 A1 | 2/2003 |
| WO | 2007/013368 A1 | 2/2007 |

OTHER PUBLICATIONS

Eurpean Search Report dated Jan. 16, 2009.

\* cited by examiner

*Primary Examiner*—Susan W Berman
(74) *Attorney, Agent, or Firm*—Sughrue Mion, PLLC

(57) ABSTRACT

An ink composition is provided that includes a perfluoroalkyl group-containing polymer, a polymerizable monomer, and a radical polymerization initiator, in which at least 80 wt % of the polymerizable monomer is a monofunctional polymerizable monomer selected from the group consisting of a monofunctional acrylate, a monofunctional methacrylate, a monofunctional vinyloxy compound, a monofunctional N-vinyl compound, a monofunctional acrylamide, and a monofunctional methacrylamide. There are also provided an inkjet recording method that includes a step of discharging the ink composition onto a recording medium and a step of curing the ink composition by irradiating the discharged ink composition with actinic radiation, a printed material obtained by the inkjet recording method, and a process for producing a molded printed material that includes a step of forming an image by discharging the ink composition onto a support by an inkjet method, a step of irradiating the image thus obtained with actinic radiation so as to cure the ink composition and obtain a printed material having the image cured on the support, and a step of molding the printed material.

14 Claims, 1 Drawing Sheet

INK COMPOSITION, INKJET RECORDING METHOD, PRINTED MATERIAL, AND PROCESS FOR PRODUCING MOLDED PRINTED MATERIAL

BACKGROUND OF THE INVENTION

1. Field of the Invention

The present invention relates to an ink composition suitably used for inkjet recording, and an inkjet recording method, a printed material, and a process for producing a molded printed material employing the ink composition.

2. Description of the Related Art

As image recording methods for forming an image on a recording medium such as paper based on an image data signal, there are an electrophotographic system, sublimation type and melt type thermal transfer systems, an inkjet system, etc. In the electrophotographic system, a process of forming an electrostatic latent image on a photosensitive drum by electrically charging and exposing is required, and the system is complicated; as a result, there is the problem that the production cost is high. With regard to the thermal transfer system, although the equipment is inexpensive, due to the use of an ink ribbon there is the problem that the running cost is high and waste material is generated.

On the other hand, with regard to the inkjet system, the printing equipment is inexpensive, it is not necessary to use a plate when printing, and since an image is formed directly on a recording medium by discharging an ink only on a required image area, the ink can be used efficiently and the running cost is low particularly in the case of small lot production. Furthermore, there is little noise and it is excellent as an image recording system, and has been attracting attention in recent years.

Among them, an inkjet recording ink (radiation-curing inkjet recording ink), which is curable upon exposure to radiation such as UV rays, is an excellent system from the viewpoint of it being printed on various types of substrates because of the drying properties being excellent, compared with a solvent-based ink since the majority of the ink components cure upon exposure to radiation such as UV rays, and an image is resistant to spreading.

There is a demand for an ink composition contained in a radiation-curing ink to cure at high sensitivity in order to form an image with high image quality.

By achieving high sensitivity for the ink composition, high curability upon exposure to actinic radiation can be imparted, and there are therefore provided various benefits such as a reduction in power consumption, a longer lifetime of an actinic radiation generator due to a decrease in the load thereon, and suppression of evaporation of uncured low-molecular-weight material and of a reduction in the strength of an image formed. There is also a desire for an ink composition that gives an image (printed material) that is resistant to cracking, peeling-off, etc., and gives a cured coating that has excellent impact resistance, flexibility, and adhesion to a substrate. A cured coating having high flexibility, impact resistance, and adhesion to a substrate enables a printed material to be displayed and stored for a long period of time in various environments while maintaining high image quality, and also has advantages such as ease of handling of the printed material.

As an ink composition, a polymerizable monomer-containing actinic radiation-curing ink for inkjet which comprises as polymerizable monomers, relative to the total polymerizable monomers, 95 to 99.99 wt % of a monofunctional monomer and 0.01 to 5 wt % of a polyfunctional monomer, and for which the ductility of a cured coating exceeds 120%, has been disclosed (International Patent Application WO 2007/013368).

Furthermore, as an ink composition, an ink composition comprising an N-vinyllactam has been disclosed (Japanese Registered Patent No. 2880845). Moreover, as an ink composition that is curable upon exposure to radiation such as UV rays, an ink composition having excellent adhesion has been disclosed (ref. JP-PCT-2004-514014 (JP-PCT denotes a published Japanese translation of a PCT application)).

BRIEF SUMMARY OF THE INVENTION

The ink composition described in International Patent Application WO 2007/013368 does not have sufficient antiblocking properties and curability. Moreover, the ink composition described in Japanese Registered Patent No. 2880845 is a high viscosity ink composition containing a polymer and an oligomer as main components of the ink composition, and it is difficult to discharge by ink jet. The ink composition described in JP-PCT-2004-514014 does not have fully satisfactory curability and cured coating flexibility.

It is an object of the present invention to provide an ink composition that has excellent curability and gives an image having excellent flexibility and anti-blocking properties, and an inkjet recording method, a printed material, and a process for producing a molded printed material employing the ink composition.

The above-mentioned objects have been accomplished by means described in (1), (11), (13), and (14) below. (2) to (10), (12), and (15), which are preferred embodiments, are also shown below.

(1) An ink composition comprising (A) a perfluoroalkyl group-containing polymer, (B) a polymerizable monomer, and (C) a radical polymerization initiator, at least 80 wt % of the polymerizable monomer being a monofunctional polymerizable monomer selected from the group consisting of a monofunctional acrylate, a monofunctional methacrylate, a monofunctional vinyloxy compound, a monofunctional N-vinyl compound, a monofunctional acrylamide, and a monofunctional methacrylamide, (2) the ink composition according to (1) above, wherein the perfluoroalkyl group-containing polymer has a weight-average molecular weight of at least 1,000 but no greater than 100,000, (3) the ink composition according to (1) or (2) above, wherein the perfluoroalkyl group-containing polymer has an ethylenically unsaturated double bond, (4) the ink composition according to any one of (1) to (3) above, wherein the perfluoroalkyl group-containing polymer has a content of at least 0.1 wt % but no greater than 5 wt % of the total ink composition, (5) the ink composition according to any one of (1) to (4) above, wherein the perfluoroalkyl group-containing polymer is a homopolymer of a monomer represented by Formula (II) below or a copolymer with another copolymerizable monomer

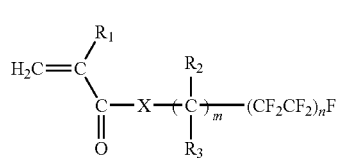

Formula (II)

wherein $R_1$ denotes a hydrogen atom, a halogen atom, an optionally substituted methyl group, or an optionally substituted ethyl group, $R_2$ and $R_3$ independently denote a hydrogen atom or an alkyl group having 1 to 4 carbons, X denotes a single bond or a divalent linking group (organic group), m denotes an integer of 0 or greater, n denotes an integer of 1 or greater, and when m is 2 or greater, functional groups on adjacent carbons (i.e. $R_2$s or $R_3$s bonded to adjacent carbons) may be bonded to form an aliphatic ring, (6) the ink composition according to any one of (1) to (5) above, wherein the monofunctional polymerizable monomer comprises a monomer having only one ethylenically unsaturated double bond group selected from the group consisting of an acryloyloxy group, a methacryloyloxy group, an acrylamide group, a methacrylamide group, and an N-vinyl group, and having a cyclic structure, (7) the ink composition according to (6) above, wherein the monofunctional polymerizable monomer having only one ethylenically unsaturated double bond group selected from the group consisting of an acryloyloxy group, a methacryloyloxy group, an acrylamide group, a methacrylamide group, and an N-vinyl group and having a cyclic structure has a content of at least 60 wt % of the total ink composition, (8) the ink composition according to any one of (1) to (7) above, wherein the monofunctional N-vinyl compound is an N-vinyllactam represented by Formula (2) below

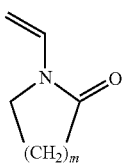

(2)

wherein m denotes an integer of 1 to 5, (9) the ink composition according to any one of (1) to (8) above, wherein it has a viscosity at 25° C. of at least 5 mPa·s but no greater than 40 mPa·s,

(10) the ink composition according to any one of (1) to (9) above, wherein it is intended for use in inkjet recording,

(11) an inkjet recording method comprising ($a^1$) a step of discharging the ink composition according to any one of (1) to (10) above onto a recording medium, and ($b^1$) a step of curing the ink composition by irradiating the discharged ink composition with actinic radiation,

(12) the inkjet recording method according to (11) above, wherein the actinic radiation has a peak wavelength of at least 200 nm but no greater than 600 nm,

(13) a printed material obtained by the inkjet recording method according to (11) or (12) above,

(14) a process for producing a molded printed material comprising ($a^2$) a step of forming an image by discharging the ink composition according to any one of (1) to (10) onto a recording medium by an inkjet method, ($b^2$) a step of irradiating the image thus obtained with actinic radiation so as to cure the ink composition and obtain a printed material having the image cured on the support, and ($c^2$) a step of molding the printed material, and

(15) the process for producing a molded printed material according to (14) above, wherein the molding step is selected from the group consisting of an embossing step, a vacuum forming step, a pressure forming step, and a vacuum/pressure forming step.

Figure 1:
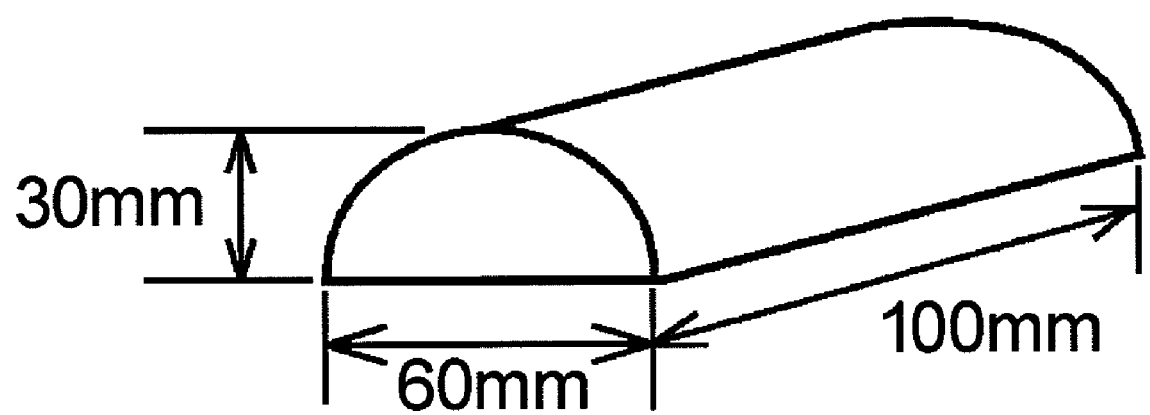
FIG. 1 is a schematic drawing of a mold used in the vacuum forming process test.

BEST MODE FOR CARRYING OUT THE INVENTION (1) Ink Composition

The ink composition of the present invention (in the present invention, the 'ink composition' is also called simply an 'ink') comprises (A) a perfluoroalkyl group-containing polymer, (B) a polymerizable monomer, and (C) a radical polymerization initiator, at least 80 wt % of the polymerizable monomer being a monofunctional polymerizable monomer selected from the group consisting of a monofunctional acrylate, a monofunctional methacrylate, a monofunctional vinyloxy compound, a monofunctional N-vinyl compound, a monofunctional acrylamide, and a monofunctional methacrylamide. The ink composition of the present invention may comprise, in addition to the components above, a colorant, a dispersant, a surfactant, a radically polymerizable compound other than the above monofunctional radically polymerizable monomer, etc.

In the present invention, the ink composition is curable upon exposure to actinic radiation.

The 'actinic radiation' referred to in the present invention is not particularly limited as long as it is actinic radiation that can provide energy that enables an initiating species to be generated in the ink composition when irradiated, and broadly includes α rays, γ rays, X rays, UV rays, visible light, and an electron beam; among these, UV rays and an electron beam are preferable from the viewpoint of curing sensitivity and the availability of equipment, and UV rays are particularly preferable. The ink composition of the present invention is therefore preferably an ink composition that is curable upon exposure to UV rays as radiation.

The components are each explained below.

(A) Perfluoroalkyl Group-Containing Polymer

The ink composition of the present invention comprises a perfluoroalkyl group-containing polymer (hereinafter, also called a fluorine polymer). In the present invention, due to the ink composition comprising a perfluoroalkyl group-containing polymer, an ink composition having excellent anti-blocking properties can be provided.

The content of the perfluoroalkyl group-containing polymer is preferably at least 0.1 wt % but no greater than 5 wt % of the total ink composition (in the present invention, 'at least 0.1 wt % but no greater than 5 wt %' is also expressed as '0.1 wt % to 5 wt %' or '0.1 to 5 wt %', the same applies below), more preferably 0.5 to 5 wt %, and yet more preferably 1 to 5 wt %.

It is preferable for the content of the perfluoroalkyl group-containing polymer to be at least 0.1 wt % since good anti-blocking properties are obtained. It is also preferable for it to be no greater than 5 wt % since an ink composition having low viscosity and having excellent discharge stability can be obtained.

In the present invention, the perfluoroalkyl group-containing polymer preferably has a weight-average molecular weight of 1,000 to 100,000, more preferably 10,000 to 50,000, and yet more preferably 10,000 to 30,000.

When the molecular weight of the perfluoroalkyl group-containing polymer is 1,000 to 100,000, good anti-blocking properties are obtained, and an ink composition having low viscosity and having excellent discharge stability can be obtained.

In the present invention, the perfluoroalkyl group-containing polymer is not particularly limited as long as it is a polymer containing a perfluoroalkyl group, and examples thereof include fluorochemical surfactants described in JP-PCT-2004-536925, fluorine-containing copolymers obtained by polymerizing using at least a monomer containing a fluorinated alkyl group and an ethylenic double bond and a monomer containing a silicone chain and an ethylenic double bond described in JP-A-2007-003945, and fluorine-based surfactants having a perfluoroalkyl group in the molecule described in JP-A-2004-323578.

In the present invention, the perfluoroalkyl group-containing polymer is preferably a polymer obtained by polymerizing a monomer having an addition-polymerizable group (preferably an ethylenically unsaturated group), and more preferably a polymer obtained by polymerizing a perfluoroalkyl group-containing (meth)acrylate.

Furthermore, it is preferably a polymer obtained by polymerizing only a (meth)acrylate, and more preferably a copolymer of a perfluoroalkyl group-containing (meth)acrylate monomer and a (meth)acrylate monomer not containing a perfluoroalkyl group.

As a perfluoro group in a starting material monomer or a perfluoroalkyl group-containing polymer, —$CF_2CF_3$ (—$C_2F_5$), —$CF_2CF_2CF_2CF_3$ (—$C_4F_9$), or $CF_2CF_2CF_2CF_2CF_2CF_3$ (—$C_6F_{13}$) is preferable, and —$C_4F_9$ or —$C_6F_{13}$ is more preferable.

In the present invention, the perfluoroalkyl group-containing polymer preferably satisfies requirement (a) or (b) below.

(a) Polymer having in a side chain a group derived from a fluoroaliphatic compound (also called a fluoroaliphatic group) produced by a telomerization method or an oligomerization method (b) Polymer having a constitution represented by Formula (I) below

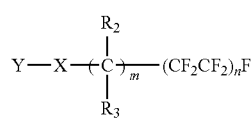

Formula (I)

In Formula (I), $R_2$ and $R_3$ independently denote a hydrogen atom or an alkyl group having 1 to 4 carbons, Y denotes a polymer chain, X denotes a single bond or a divalent linking group (organic group), m denotes an integer of 0 or greater, and n denotes an integer of 1 or greater. When m is 2 or greater, functional groups on adjacent carbons (i.e. $R_2$s or $R_3$s bonded to adjacent carbons) may be bonded to form an aliphatic ring.

The perfluoroalkyl group-containing polymer, including a polymer that satisfies the requirement described in (a) or (b) above, may be in any configuration of polymer. Specific examples thereof include an acrylic resin, a methacrylic resin, a styryl resin, a polyester resin, a polyurethane resin, a polycarbonate resin, a polyamide resin, a polyacetal resin, a phenol/formaldehyde condensation resin, a polyvinylphenol resin, a maleic anhydride/α-olefin resin, and an α-hetero-substituted methacrylic resin. Among them, an acrylic resin, a methacrylic resin, a styryl resin, a polyester resin, or a polyurethane resin is suitable, and an acrylic resin, a methacrylic resin, or a polyurethane resin is particularly suitable.

(a) Polymer having in Side Chain Group Derived from Fluoroaliphatic Compound Produced by Telomerization Method or Oligomerization Method In the present invention, the perfluoroalkyl group-containing polymer (fluorine polymer) is preferably a polymer having in a side chain a group derived from a fluoroaliphatic compound produced by a telomerization method (also called a telomer method) or an oligomerization method (also called an oligomer method). With regard to a production process for the fluoroaliphatic compound, it is described in, for example, 'Synthesis and Function of Fluorine Compounds' (Editor: Nobuo Ishikawa, published by CMC, 1987) pp. 117 to 118 or 'Chemistry of Organic Fluorine Compounds II' (Monograph 187, Ed by Milos Hudlicky and Attila E. Pavlath, American Chemical Society 1995) pp. 747 to 752.

The telomerization method referred to is a method in which a telomer is synthesized by carrying out radical polymerization of a fluorine-containing vinyl compound such as tetrafluoroethylene using as a telogen an alkyl halide having a large chain transfer constant such as an iodide. As a specific example, Synthetic Example 1 below is cited.

Synthetic Example 1

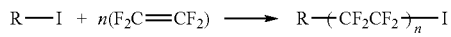

The terminally iodinated telomer thus obtained is normally subjected to an appropriate terminal chemical modification such as one in Synthetic Example 2 below, to give fluoroaliphatic compounds. These compounds are further converted into desired monomer structures, and used in the production of a fluoroaliphatic group-containing polymer.

Synthetic Example 2

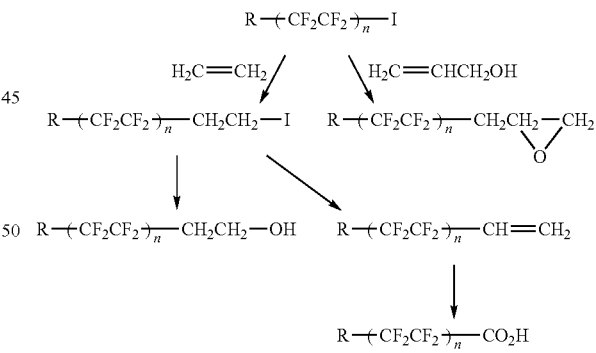

As a monomer synthesized by the telomer method above, a monomer represented by Formula [TM-1] below is preferable.

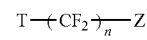

[TM-1]

In Formula [TM-1] above, T denotes one type of group selected from Group T below, Z denotes one type of group selected from Group Z below, and n denotes an integer of 0 to 20.

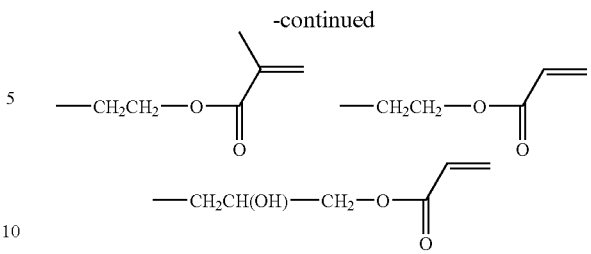

Group T

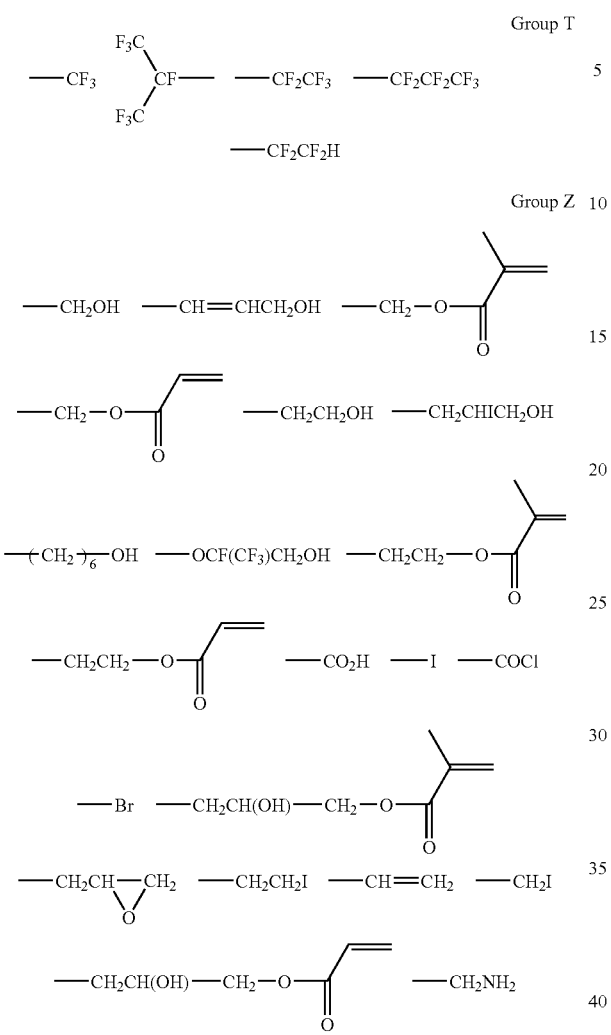

Group Z

In Formula [TM-1] above, a compound in which the group denoted by Z is one type of group selected from Group Z' below is particularly preferable since, due to it having an acryloyl group or a methacryloyl group at a molecular terminus, a polymer having in a side chain a group derived from the fluoroaliphatic compound is simply obtained from vinyl polymerization.

Group Z'

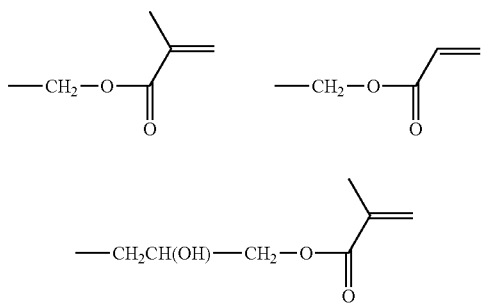

In the present invention, specific examples of the compound produced by the above-mentioned telomer method, which is suitable as a compound introduced into a side chain of the perfluoroalkyl group-containing polymer (compound having as main component monomer represented by Formula [TM-1] above), include the fluorine-based chemical products A-1110, A-1210, A-1310, A-1420, A-1620, A-1820, A-2020, A-1260, A-1460, A-1660, A-1860, A-1435, A-1635, A-1835, A-1473, A-1637, A-1837, A-1514, A-3420, A-3620, A-3820, A-4020, A-3260, A-3460, A-3660, A-3860, A-3637, A-3837, A-5210, A-5410, A-5610, A-5810, A-7110, A-7210, A-7310, A-9211, C-1100, C-1200, C-1300, C-1400, C-1500, C-1600, C-1700, C-1800, C-1900, C-2000, C-5200, C-5400, C-5600, C-5800, C-5208, C-5408, C-5608, C-6008, C-8200, C-8300, C-8500, C-9211, C-8208, C-8308, C-8508, C-9216, E-1430, E-1630, E-1830, E-2030, E-3430, E-3630, E-3830, E-4030, E-5244, E-5444, E-5644, E-5844, F-1420, F-1620, F-1820, F-2020, I-1200, I-1300, I-1400, I-1600, I-1700, I-1800, I-2000, I-1420, I-1620, I-1820, I-2020, I-3200, I-3400, I-3600, I-3800, I-4000, I-3620, I-3820, I-4020, I-5200, I-5400, I-5600, I-8208, I-8207, I-8407, I-8607, M-1110, M-1210, M-1420, M-1620, M-1820, M-2020, M-3420, M-3620, M-3820, M-4020, M-3433, M-3633, M-3833, M-4033, M-5210, M-5410, M-5610, M-5810, M-6010, M-7210, M-7310, R-1110, R-1210, R-1420, R-1620, R-1820, R-2020, R-1433, R-1633, R-1833, R-3420, R-3620, R-3820, R-4020, R-3433, R-5210, R-5410, R-5610, R-5810, R-6010, R-7210, R-7310, U-1310, and U-1710 available from Daikin Chemicals Sales Co., Ltd., and CHEMINOX FA, FA-M, FAAC, FAAC-M, FAMAC, and FAMAC-M manufactured by Nippon Mektron, Ltd.

A polymer having a fluoroaliphatic group in a side chain can easily be derived from the compounds produced by the telomer method by a method known to a person skilled in the art.

In the present invention, as the perfluoroalkyl group-containing polymer, a fluoroaliphatic compound produced by an oligomerization method (oligomer method) is also preferable. The oligomerization method is a method in which an oligomer is produced by cationically polymerizing tetrafluoroethylene in a polar solvent such as diglyme using potassium fluoride or cesium fluoride as a catalyst. As a specific example, Synthetic Example 3 below is illustrated. A polymer having in a side chain a group derived from a fluoroaliphatic compound (i.e. a perfluoroalkyl group-containing polymer) may be derived from a fluoroaliphatic compound obtained by the oligomer method, via appropriate chemical modification by utilizing a reactive group (unsaturated bond), etc. in the oligomer obtained by the polymerization in the same manner as for the compound from the above-mentioned telomer method.

Synthetic Example 3

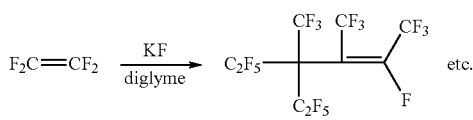

(b) Polymer having Structure Represented by Formula (I)

In the present invention, from the viewpoint of localization on the ink surface, the perfluoroalkyl group-containing polymer preferably has the constitution of Formula (I) below.

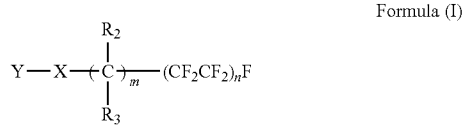

Formula (I)

In Formula (I), $R_2$ and $R_3$ independently denote a hydrogen atom or an alkyl group having 1 to 4 carbons, Y denotes a polymer chain, X denotes a single bond or a divalent linking group (organic group), m denotes an integer of 0 or greater, and n denotes an integer of 1 or greater. When m is 2 or greater, functional groups on adjacent carbons (i.e. $R_2$s or $R_3$s bonded to adjacent carbons) may be bonded to form an aliphatic ring.

Among perfluoroalkyl group-containing polymers having the constitution represented by Formula (I) above, n in Formula (I) is preferably 1 to 10, more preferably 1 to 4, and particularly preferably 2 or 3.

That is, it has been found that in the present invention, with regard to the perfluoroalkyl group-containing polymer, the structure of a side chain moiety bonded to the polymer chain has a structure represented by Formula (IB) below and, in particular, if n=2 or 3, very good performance is exhibited.

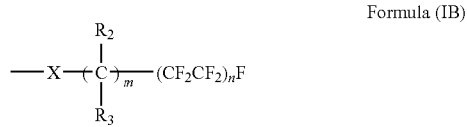

Formula (IB)

In Formula (IB), $R_2$ and $R_3$, X, m, and n have the same meanings as those of $R_2$ and $R_3$, X, m, and n in Formula (I).

In Formula (I) and Formula (IB), examples of the alkyl group having 1 to 4 carbons denoted by $R_2$ and $R_3$ include a methyl group, an ethyl group, a propyl group, an isopropyl group, an n-butyl group, an isobutyl group, and a tert-butyl group, and $R_2$ and $R_3$ are preferably a hydrogen atom or a methyl group, and more preferably a hydrogen atom.

In Formula (I) and Formula (IB), the single bond denoted by X means a case in which it is directly bonded to a polymer main chain. Furthermore, examples of the divalent linking group (organic group) include —O—, —S—, —N($R_4$)—, and —CO—. Among them, —O— is preferable.

Furthermore, $R_4$ above denotes a hydrogen atom or an alkyl group having 1 to 4 carbons. Examples of the alkyl group include a methyl group, an ethyl group, a propyl group, an isopropyl group, an n-butyl group, an isobutyl group, and a tert-butyl group, and $R_4$ is preferably a hydrogen atom or a methyl group.

m denotes an integer of 0 or greater, preferably an integer of 2 to 8, and m=2 is particularly preferable. When m is 2 or greater, functional groups on adjacent carbons may be bonded to each other to form an aliphatic ring.

n denotes an integer of 1 or greater, and preferably an integer of 1 to 10. n is more preferably 1 to 4, and n is yet more preferably 2 or 3.

In Formula (I), Y denotes a polymer chain. Examples of the polymer chain denoted by Y include those below.

Specific configurations include an acrylic resin, a methacrylic resin, a styryl resin, a polyester resin, a polyurethane resin, a polycarbonate resin, a polyamide resin, a polyacetal resin, a phenol/formaldehyde condensation resin, a polyvinylphenol resin, a maleic anhydride/α-olefin resin, and an α-hetero substituted methacrylic resin. Among them, an acrylic resin, a methacrylic resin, a styryl resin, a polyester resin, and a polyurethane resin are useful, and an acrylic resin and a methacrylic resin are particularly useful.

Process for Producing Perfluoroalkyl Group-Containing Polymer

A specific process for producing a perfluoroalkyl group-containing polymer suitably used in the present invention, including a polymer satisfying the requirements described in (a) and (b) above, is now explained. In the present invention, the perfluoroalkyl group-containing polymer may be obtained easily by polycondensation, addition polymerization, ring-opening polymerization, etc., which are methods known to a person skilled in the art, using an appropriate polymerizable monomer.

A polymer satisfying the requirement (a) above may be produced by appropriately selecting a fluorine-containing monomer starting material. Furthermore, a polymer satisfying the requirement (b) above may be produced by appropriately selecting starting materials when producing a monomer and when carrying out polymerization, and by as necessary mixing or mixing a polymer after polymerization.

A process for producing a polymer satisfying the requirement (b) above in particular (i.e. a polymer having a structure represented by Formula (I) above) is explained in detail below with as examples an acrylic resin and a methacrylic resin, which are the most useful and have excellent suitability for production of a polymer.

Among perfluoroalkyl group-containing polymers, a preferred embodiment of a polymer corresponding to the acrylic resin includes a polymer polymerized using a monomer represented by Formula (II) below. That is, it is a polymer obtained by homopolymerizing a monomer represented by Formula (II) or a polymer obtained by copolymerizing with another copolymerizable monomer.

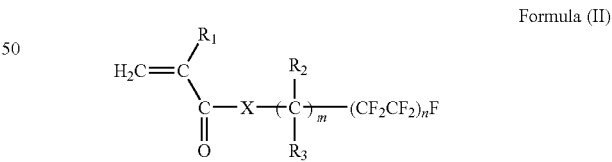

Formula (II)

In Formula (II), $R_1$ denotes a hydrogen atom, a halogen atom, an optionally substituted methyl group, or an optionally substituted ethyl group. $R_2$ and $R_3$, X, m, and n have the same meanings as those of $R_2$ and $R_3$, X, m, and n in Formula (IB).

In Formula (II), examples of a halogen atom denoted by $R_1$ include a fluorine atom, a chlorine atom, and a bromine atom.

Specific examples of a monomer represented by Formula (II) above used in the present invention (including specific examples of monomer used in production of a polymer having a constitution represented by Formula (I)) are shown below.

(Specific examples, n = 4)
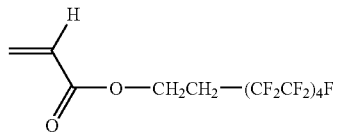 (F-1)
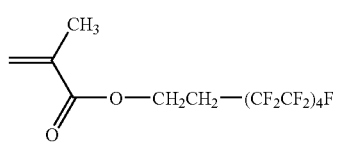 (F-2)
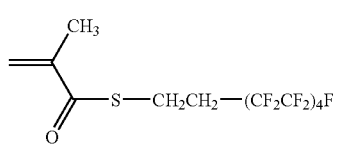 (F-3)
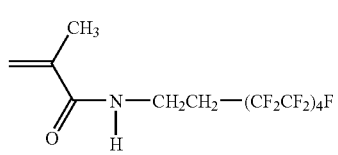 (F-4)
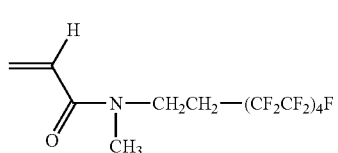 (F-5)
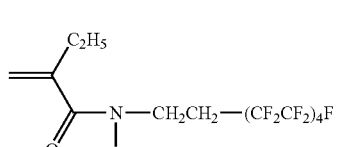 (F-6)
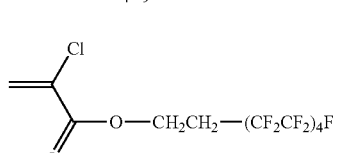 (F-7)
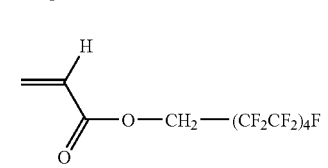 (F-8)
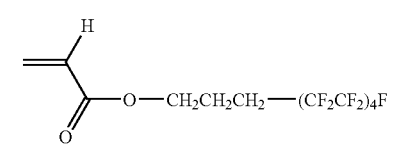 (F-9)
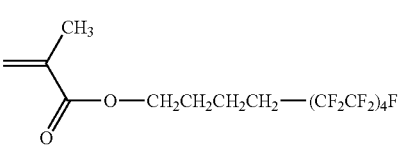 (F-10)
-continued
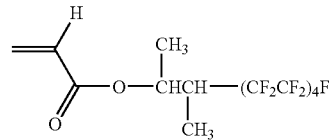 (F-11)
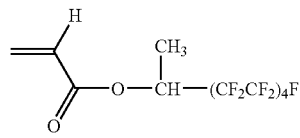 (F-12)
(Specific examples, n = 3)
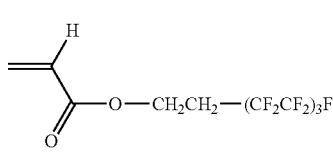 (F-13)
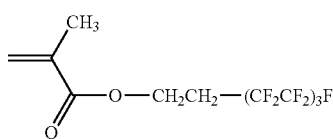 (F-14)
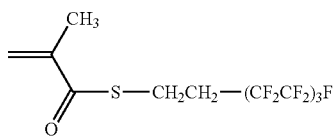 (F-15)
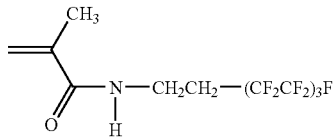 (F-16)
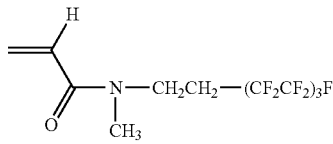 (F-17)
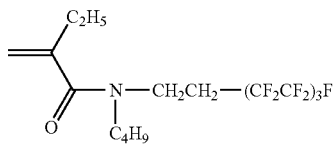 (F-18)
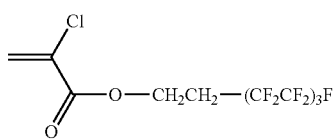 (F-19)
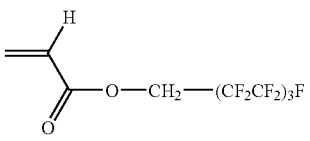 (F-20)

-continued
(F-21) 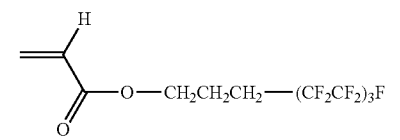
(F-22) 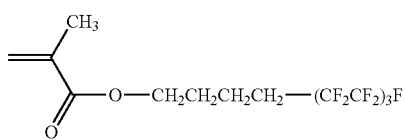
(F-23) 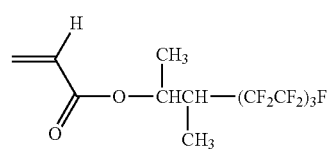
(F-24) 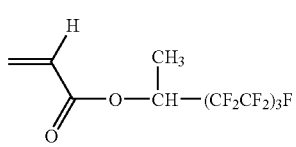
(Specific examples, n = 1)
(F-25) 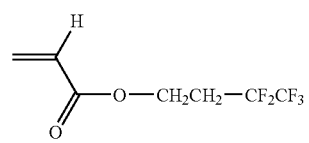
(F-26) 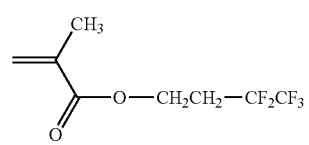
(F-27) 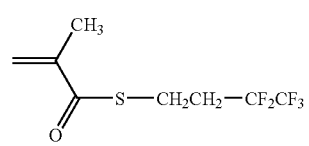
(F-28) 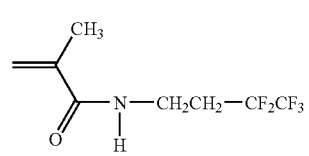
(F-29) 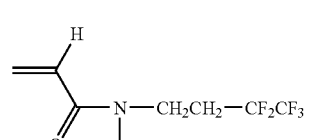
(F-30) 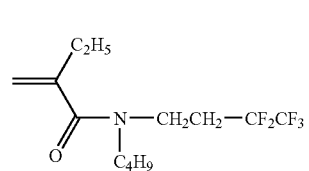
-continued
(F-31) 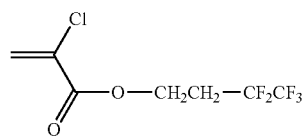
(F-32) 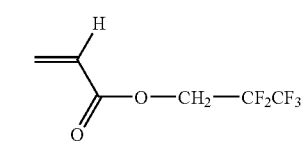
(F-33) 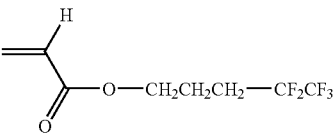
(F-34) 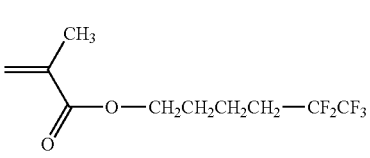
(F-35) 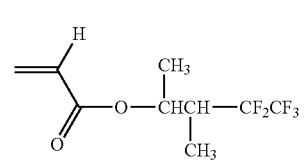
(F-36) 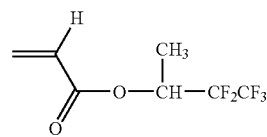
(Specific examples, n = 2)
(F-37) 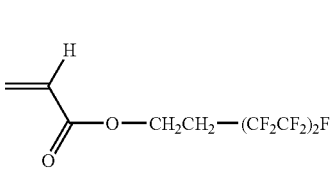
(F-38) 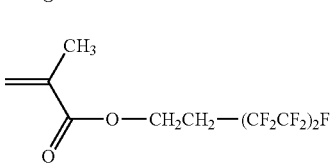
(F-39) 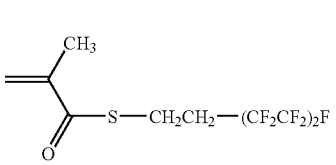
(F-40) 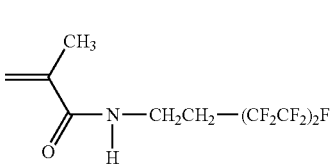

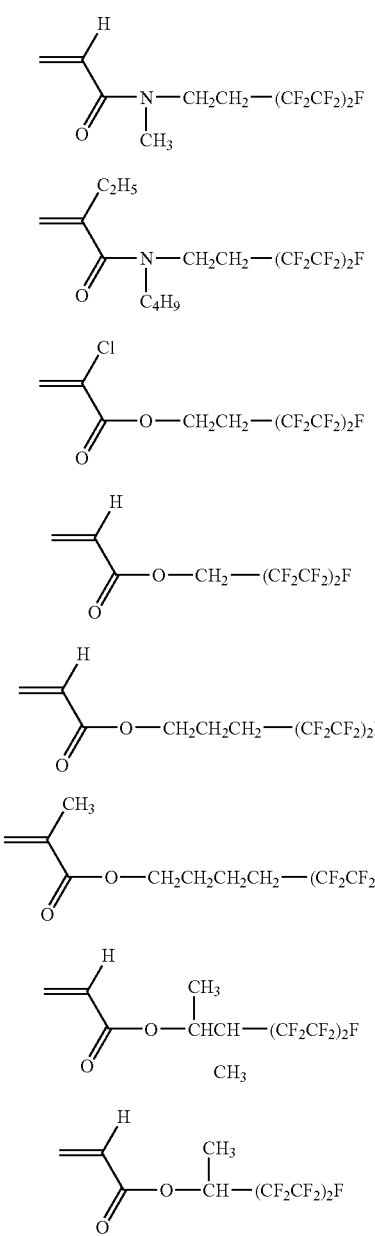

Among fluorine-based monomers represented by Formula (II) above, a monomer used in production of a perfluoroalkyl group-containing polymer suitably used in the present invention is preferably one for which n in Formula (II) is 1 to 10, more preferably 1 to 4, and particularly preferably 2 or 3.

In the present invention, the perfluoroalkyl group-containing polymer preferably contains at least 4 mmol of fluorine atom in 1 g of the molecule from the viewpoint of surface orientation, but no greater than 25 mmol of fluorine atom in 1 g of the molecule from the viewpoint of ink solubility. A more preferred range is 4 mmol to 8 mmol in 1 g of the molecule.

Furthermore, in the present invention, the perfluoroalkyl group-containing polymer preferably has a radically polymerizable group-containing monomer that is copolymerizable with a monomer represented by Formula (II) as a copolymerization component.

The radically polymerizable group is preferably a polymerizable group having a radically polymerizable ethylenically unsaturated bond. The radically polymerizable group (radical polymerization type polymerizable group) is explained in detail below.

Radically Polymerizable Group

As the radically polymerizable group, a polymerizable group having a radically polymerizable ethylenically unsaturated bond can be cited, and it may be any as long as there is a substituent having at least one radically polymerizable ethylenically unsaturated bond in a polymer. Examples of the polymerizable group having a radically polymerizable ethylenically unsaturated bond include unsaturated carboxylic acid ester groups such as an acrylic acid ester group, a methacrylic acid ester group, an itaconic acid ester group, a crotonic acid ester group, an isocrotonic acid ester group, and a maleic acid ester group, and radically polymerizable groups such as a styrene group. Among them, a methacrylic acid ester group and an acrylic acid ester group are preferable.

In the present invention, a preferred embodiment of the perfluoroalkyl group-containing polymer is a methacrylic resin or an acrylic resin.

Specific preferred examples of the perfluoroalkyl group-containing polymer are cited below. The present invention should not be construed as being limited to these specific examples. The polymers below show ratio by weight of the monomer units.

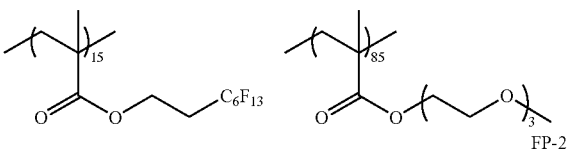

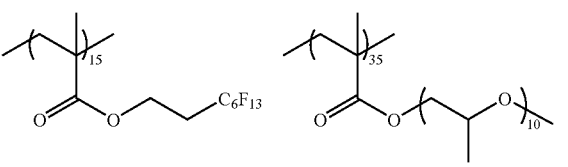

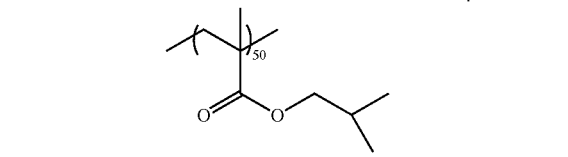

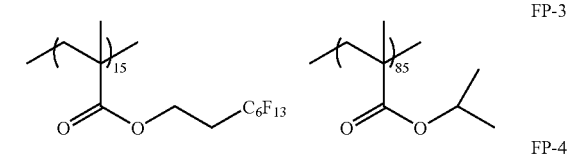

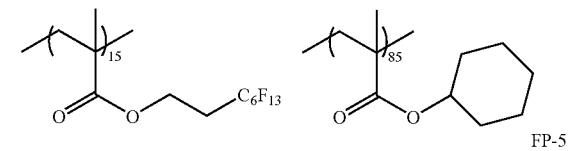

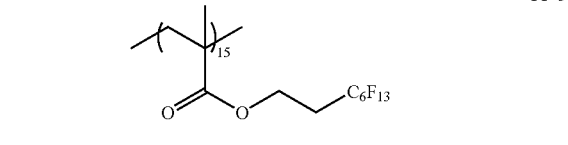

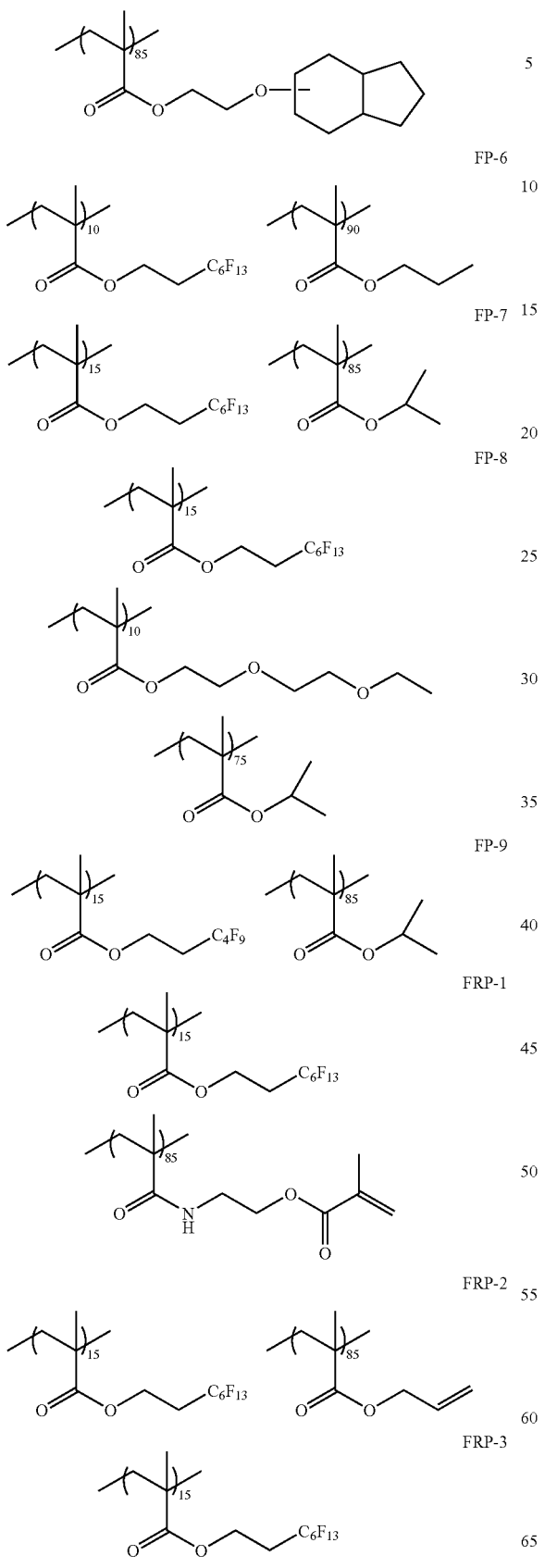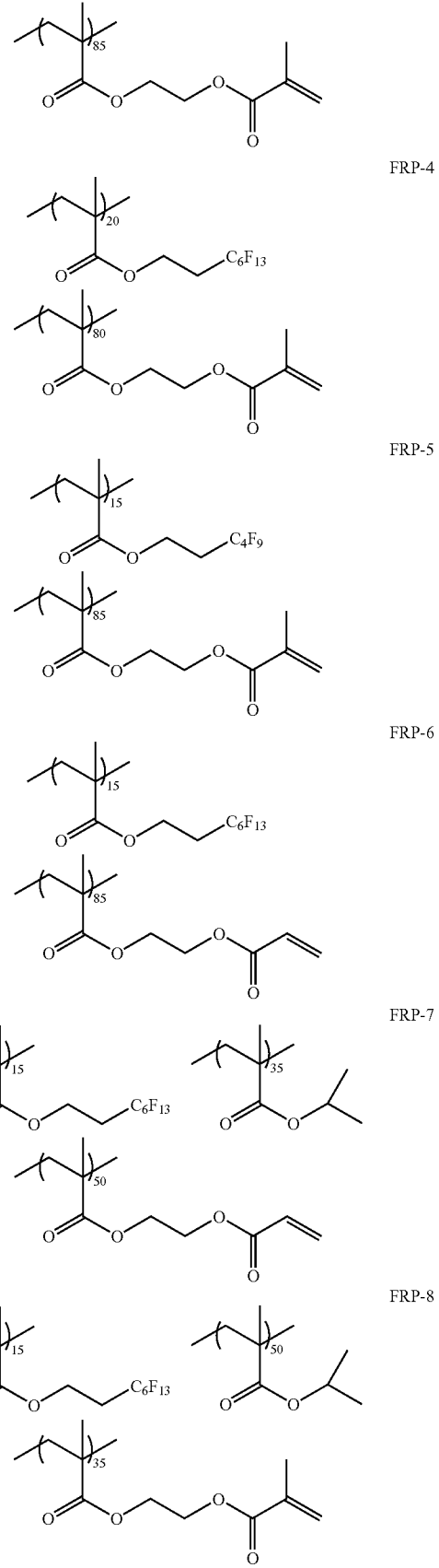

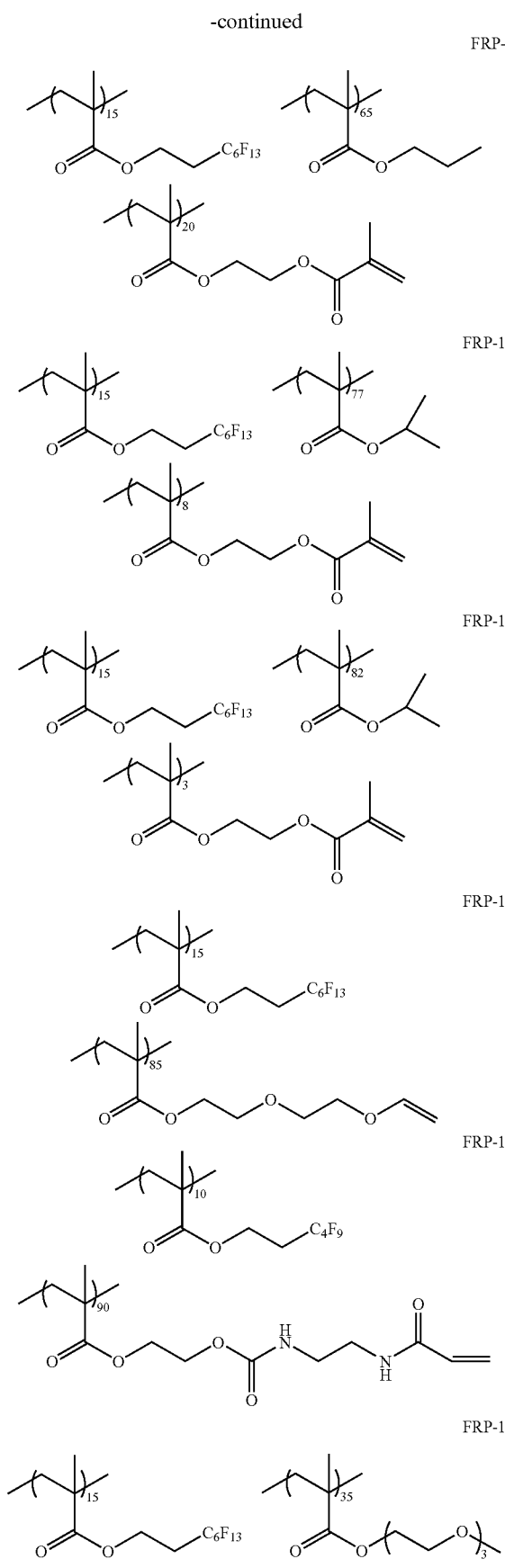

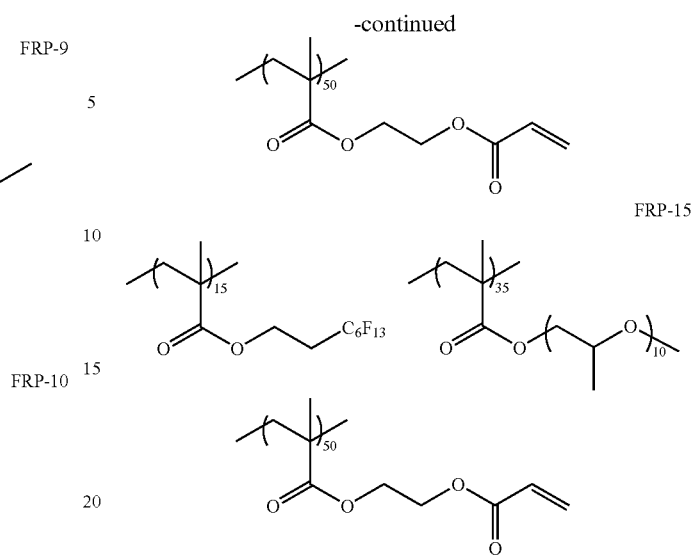

Among them, preferred examples of the perfluoro group-containing polymer include FRP-3, FRP-5, FRP-8, FRP-9, FRP-10, and FRP-11, and FRP-3, FRP-5, FRP-8, and FRP-9 are particularly preferable.

(B) Polymerizable Monomer

The ink composition of the present invention comprises a polymerizable monomer, at least 80 wt % of the polymerizable monomer being a monofunctional polymerizable monomer (hereinafter, also called a monofunctional radically polymerizable monomer) selected from the group consisting of a monofunctional acrylate (monofunctional acrylic acid ester), a monofunctional methacrylate (monofunctional methacrylic acid ester), a monofunctional vinyloxy compound, a monofunctional N-vinyl compound, a monofunctional acrylamide, and a monofunctional methacrylamide.

In the present invention, the polymerizable monomer preferably has a molecular weight of no greater than 1,000, more preferably 50 to 800, and yet more preferably 60 to 500.

Monofunctional Radically Polymerizable Monomer

The ink composition of the present invention comprises at least 80 wt %, relative to the polymerizable monomers, of the monofunctional polymerizable monomer (also called the monofunctional radically polymerizable monomer) selected from the group consisting of a monofunctional acrylate (monofunctional acrylic acid ester), a monofunctional methacrylate (monofunctional methacrylic acid ester), a monofunctional vinyloxy compound, a monofunctional N-vinyl compound, a monofunctional acrylamide, and a monofunctional methacrylamide.

When the content of the monofunctional radically polymerizable monomer is less than 80 wt %, sufficient flexibility and anti-blocking properties cannot be obtained for a cured ink image.

When the content of the monofunctional radically polymerizable monomer is at least 80 wt %, it is surmised that the mobility of the perfluoroalkyl group-containing polymer in the cured coating becomes high, the surface localization ratio of the perfluoroalkyl group-containing monomer becomes high, and as a result excellent anti-blocking properties can be obtained.

The content of the monofunctional radically polymerizable monomer is preferably 80 to 99 wt % of the polymerizable monomers, and more preferably 85 to 98 wt %.

The monofunctional acrylate (monofunctional acrylic acid ester) has one acryloyloxy group in the molecule, and does not have another radically polymerizable functional group (methacryloyloxy group, acrylamide group, methacrylamide group, vinyloxy group, or N-vinyl group). The same applies to the monofunctional methacrylate, the monofunctional vinyloxy compound, the monofunctional N-vinyl compound, the monofunctional acrylamide compound, and the monofunctional methacrylamide compound.

That is, the ink composition of the present invention comprises at least 80 wt %, relative to the total monomers, of the monofunctional radically polymerizable monomer having only one ethylenically unsaturated double bond group selected from the group consisting of an acryloyloxy group, a methacryloyloxy group, an acrylamide group, a methacrylamide group, a vinyloxy group, and an N-vinyl group.

Among them, a monofunctional acrylate, a monofunctional methacrylate, a monofunctional N-vinyl compound, a monofunctional acrylamide, and a monofunctional methacrylamide are preferable, and a monofunctional acrylate, a monofunctional methacrylate, and a monofunctional N-vinyl compound are more preferable. In the present invention, as the monofunctional radically polymerizable monomer, it is preferable to use in combination a monofunctional acrylate and a monofunctional N-vinyl compound, or a monofunctional methacrylate and a monofunctional N-vinyl compound, and it is particularly preferable to use in combination a monofunctional acrylate and a monofunctional N-vinyl compound.

As the monofunctional radically polymerizable monomer, it is preferable to use a monomer having a cyclic structure and only one ethylenically unsaturated double bond group selected from the group consisting of an acryloyloxy group, a methacryloyloxy group, an acrylamide group, a methacrylamide group, and an N-vinyl group.

As the radically polymerizable monomer suitably used in the present invention, ethylenically unsaturated compounds represented by Formula (1) below can be cited.

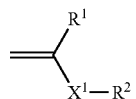

(1)

In Formula (1) above, $R^1$ denotes a hydrogen atom or a methyl group.

$X^1$ denotes a first divalent linking group in which (—C(O)O—) or (—C(O)NH—) is bonded to the ethylenically unsaturated double bond shown in Formula (1), the first divalent linking group may be bonded to a second divalent linking group that is a single bond, an ether bond (—O—), an ester bond (—C(O)O— or OC(O)—), an amide bond (—C(O)NH— or —NHC(O)—), a carbonyl bond (—C(O)—), an optionally branched alkylene group having no greater than 20 carbons, or a combination thereof, and it is preferable for $X^1$ to be the first divalent linking group alone or one having an ether bond, an ester bond, and/or an alkylene group having no greater than 20 carbons when it has the second divalent linking group.

$R^2$ is a group having at least one cyclic structure, and denotes an aromatic group such as a monocyclic aromatic group or a polycyclic aromatic group, or an alicyclic hydrocarbon group having a cycloalkane skeleton, an adamantane skeleton, or a norbornane skeleton. The aromatic group and the alicyclic hydrocarbon group may comprise a heteroatom such as O, N, or S in the cyclic structure.

In Formula (1), the aromatic group denoted by $R^2$ is preferably a phenyl group, which is a monocyclic aromatic group, or a polycyclic aromatic group having 2 to 4 rings, but is not limited thereto, and specific examples thereof include a naphthyl group, an anthryl group, a 1H-indenyl group, a 9H-fluorenyl group, a 1H-phenalenyl group, a phenanthrenyl group, a triphenylenyl group, a pyrenyl group, a naphthacenyl group, a tetraphenylenyl group, a biphenylenyl group, an as-indacenyl group, an s-indacenyl group, an acenaphthylenyl group, a fluoranthenyl group, an acephenanthrenyl group, an aceanthrenyl group, a chrysenyl group, and a pleiadenyl group.

These aromatic groups may be aromatic heterocyclic groups containing a heteroatom such as O, N, or S. Specific examples thereof include monocyclic aromatic heterocyclic groups such as a furyl group, a thiophenyl group, a 1H-pyrrolyl group, a 2H-pyrrolyl group, a 1H-pyrazolyl group, a 1H-imidazolyl group, an isooxazolyl group, an isothiazolyl group, a 2H-pyranyl group, a 2H-thiopyranyl group, a pyridyl group, a pyridazinyl group, a pyrimidinyl group, a pyrazinyl group, a 1,2,3-triazolyl group, and a 1,2,4-triazolyl group.

Furthermore, examples thereof include polycyclic aromatic heterocyclic groups such as a thianthrenyl group, benzofuranyl group, an isobenzofuranyl group, an isochromenyl group, a 4H-chromenyl group, an xanthenyl group, a phenoxathiinyl group, an indolizinyl group, an isoindolyl group, an indolyl group, an indazolyl group, a purinyl group, a 4H-quinolizinyl group, an isoquinolyl group, a quinolino group, a phthalazinyl group, a naphthyridinyl group, a quinoxalinyl group, a quinazolinyl group, a cinnolinyl group, a pteridinyl group, a carbazolyl group, a β-carbolinyl group, a phenanthridinyl group, an acridinyl group, a perimidinyl group, a phenanthrolinyl group, a phenazinyl group, a phenothiazinyl group, a phenoxazinyl group, and a pyrrolizinyl group.

These aromatic groups may have one or more halogen atoms, hydroxyl groups, amino groups, thiol groups, siloxane groups, or substituents having no greater than 30 carbons. The aromatic group may form a cyclic structure containing a heteroatom such as O, N, or S from two or more substituents thereof as in, for example, phthalic anhydride or phthalimide anhydride.

Furthermore, $R^2$ of Formula (1) may be an alicyclic hydrocarbon group. Moreover, it may be an alicyclic hydrocarbon group containing a heteroatom such as O, N, or S.

The alicyclic hydrocarbon group may be a group having a cycloalkane with 3 to 12 carbons.

Specific examples of the alicyclic hydrocarbon group containing a heteroatom such as O, N, or S include a pyrrolidinyl group, a pyrazolidinyl group, an imidazolidinyl group, an isooxazolidinyl group, an isothiazolidinyl group, a piperidinyl group, a piperazinyl group, a morpholinyl group, and a thiomorpholinyl group.

These alicyclic hydrocarbon and heteromonocycle-containing alicyclic hydrocarbon groups may have one or more substituents, and examples of the substituent include a halogen atom, a hydroxyl group, an amino group, a thiol group, a siloxane group, and an optionally substituted hydrocarbon group having a total of no greater than 30 carbons. It may have an oxy group (=O) as a divalent substituent, and two or more substituents of the alicyclic hydrocarbon group may form a heterocyclic structure containing a heteroatom such as O, N, or S.

Furthermore, $R^2$ of Formula (1) may be a group having an adamantane skeleton represented by Formula (I) below or an alicyclic hydrocarbon group having a norbornane skeleton represented by Formula (II) below.

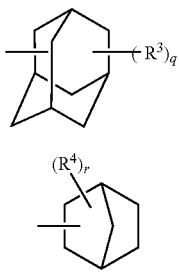

Formula (I)

Formula (II)

R³ and R⁴ in Formula (I) or Formula (II) independently denote a substituent that may be bonded to any position on each of the alicyclic hydrocarbon structures. Furthermore, the q R³s and the r R⁴s may each be identical to or different from each other.

The q R³s and the r R⁴s may independently be a monovalent or polyvalent substituent; the monovalent substituent is preferably a hydroxyl group, a substituted or unsubstituted amino group, a thiol group, a siloxane group, or an optionally substituted hydrocarbon group or heterocyclic group having a total of no greater than 30 carbons, and a divalent substituent is preferably an oxy group (=O).

The substitution number q for R³ denotes an integer of 0 to 5, and the substitution number r for R⁴ denotes an integer of 0 to 5.

Furthermore, one carbon atom of the adamantane framework in Formula (I) may be replaced by a carbonyl bond (—C(O)—) and/or an ester bond (—C(O)O—), and one carbon atom of the norbornane framework in Formula (II) may be replaced by an ether bond (—O—) and/or an ester bond (—C(O)O—).

The norbornane skeleton represented by Formula (II) may have a cyclic hydrocarbon structure represented by Formula (III). n in Formula (III) denotes a cyclic hydrocarbon structure whose opposite termini may substitute any positions of the norbornane skeleton, it may be a monocyclic structure or a polycyclic structure, and it may contain a carbonyl bond (—C(O)—) and/or an ester bond (—C(O)O—) in the cyclic hydrocarbon structure as well as the hydrocarbon bonds.

Formula (III)

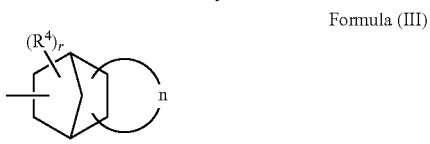

The cyclic structure represented by Formula (III) above is preferably a structure represented by Formula (IV), Formula (V), or Formula (VI).

Formula (IV)

Formula (V)

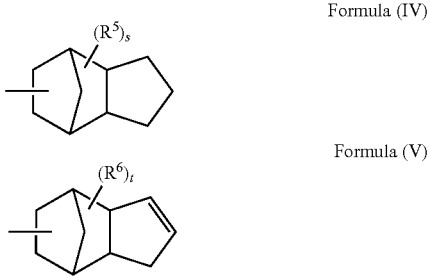

Formula (VI)

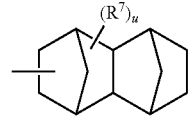

In Formula (IV), Formula (V), and Formula (VI), R⁵, R⁶, and R⁷ independently denote a substituent, s, t, and u independently denote an integer of 0 to 5, and the s R⁵s, the t R⁶s, and the u R⁷s may each be identical to or different from each other.

X¹ of Formula (1) may be bonded to any position on each of the alicyclic hydrocarbon structures shown below in Formula (IV), Formula (V), or Formula (VI).

R⁵, R⁶, and R⁷ of Formula (IV), Formula (V), or Formula (VI) independently denote a substituent, and may be bonded to any position on each of the alicyclic hydrocarbon structures shown below in Formula (IV), Formula (V), or Formula (VI). The substituents R⁵, R⁶, and R⁷ have the same meanings as the substituents R³ and R⁴ of Formula (I) to Formula (III), and preferred ranges are also the same.

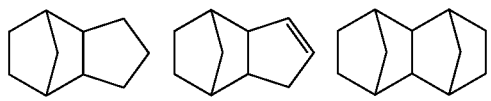

In the present invention, preferred examples of the monofunctional acrylate, the monofunctional methacrylate, the monofunctional vinyloxy compound, the monofunctional acrylamide, and the monofunctional methacrylamide include monofunctional radically polymerizable monomers having a group with a cyclic structure such as a phenyl group, a naphthyl group, an anthracenyl group, a pyridinyl group, a tetrahydrofurfuryl group, a piperidinyl group, a cyclohexyl group, a cyclopentyl group, a cycloheptyl group, an isobornyl group, or a tricyclodecanyl group.

Preferred examples of the monofunctional radically polymerizable monomer that can be used in the present invention include norbornyl(meth)acrylate, isobornyl(meth)acrylate, cyclohexyl(meth)acrylate, cyclopentyl(meth)acrylate, cycloheptyl(meth)acrylate, cyclooctyl(meth)acrylate, cyclodecyl (meth)acrylate, dicyclodecyl(meth)acrylate, trimethylcyclohexyl(meth)acrylate, 4-t-butylcyclohexyl(meth)acrylate, acryloylmorpholine, 2-benzyl(meth)acrylate, phenoxyethyl (meth)acrylate, phenoxydiethylene glycol(meth)acrylate, phenoxytriethylene glycol(meth)acrylate, ethylene oxide-modified cresol(meth)acrylate (hereinafter, 'ethylene oxide' is also called 'EO'), tetrahydrofurfuryl(meth)acrylate, caprolactone-modified tetrahydrofurfuryl acrylate, nonylphenoxy polyethylene glycol(meth)acrylate, neopentyl glycol benzoate(meth)acrylate, paracumylphenoxyethylene glycol (meth)acrylate, N-phthalimidoethyl(meth)acrylate, pentamethylpiperidyl(meth)acrylate, tetramethylpiperidyl(meth) acrylate, N-cyclohexyl(meth)acrylamide, N-(1,1-dimethyl-2-phenyl)ethyl(meth)acrylamide, N-diphenylmethyl(meth) acrylamide, N-phthalimidomethyl(meth)acrylamide, N-(1, 1'-dimethyl-3-(1,2,4-triazol-1-yl))propyl(meth)acrylamide, and 5-(meth)acryloyloxymethyl-5-ethyl-1,3-dioxacyclohexane.

Furthermore, preferred specific examples of the monofunctional radically polymerizable monomer that can be used in the present invention are shown in M-1 to M-56 below.

In some of the compound examples below, a hydrocarbon chain is represented by a simplified structural formula in which symbols for carbon (C) and hydrogen (H) are omitted.
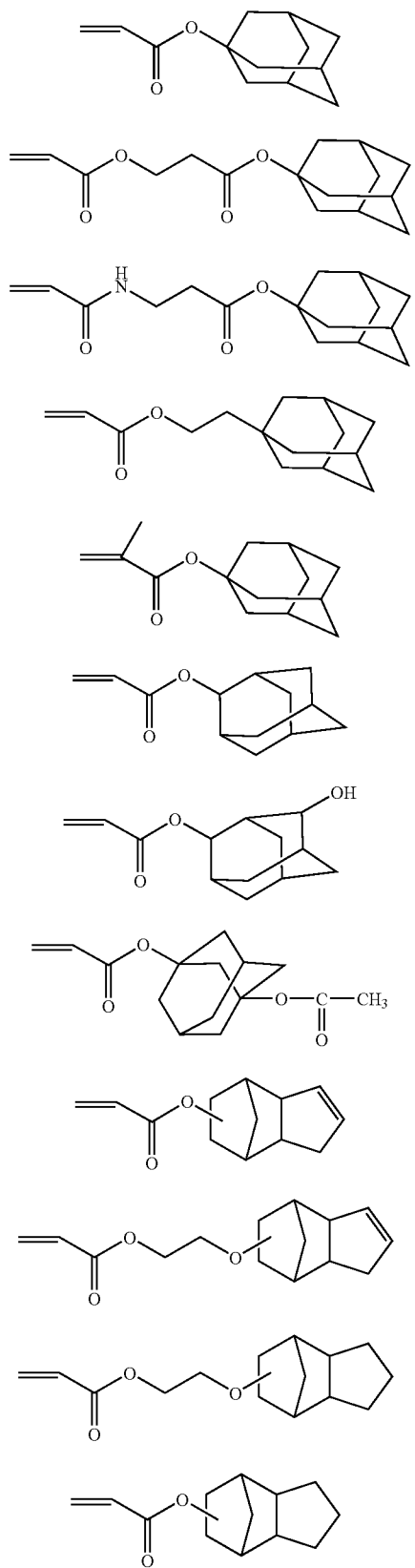
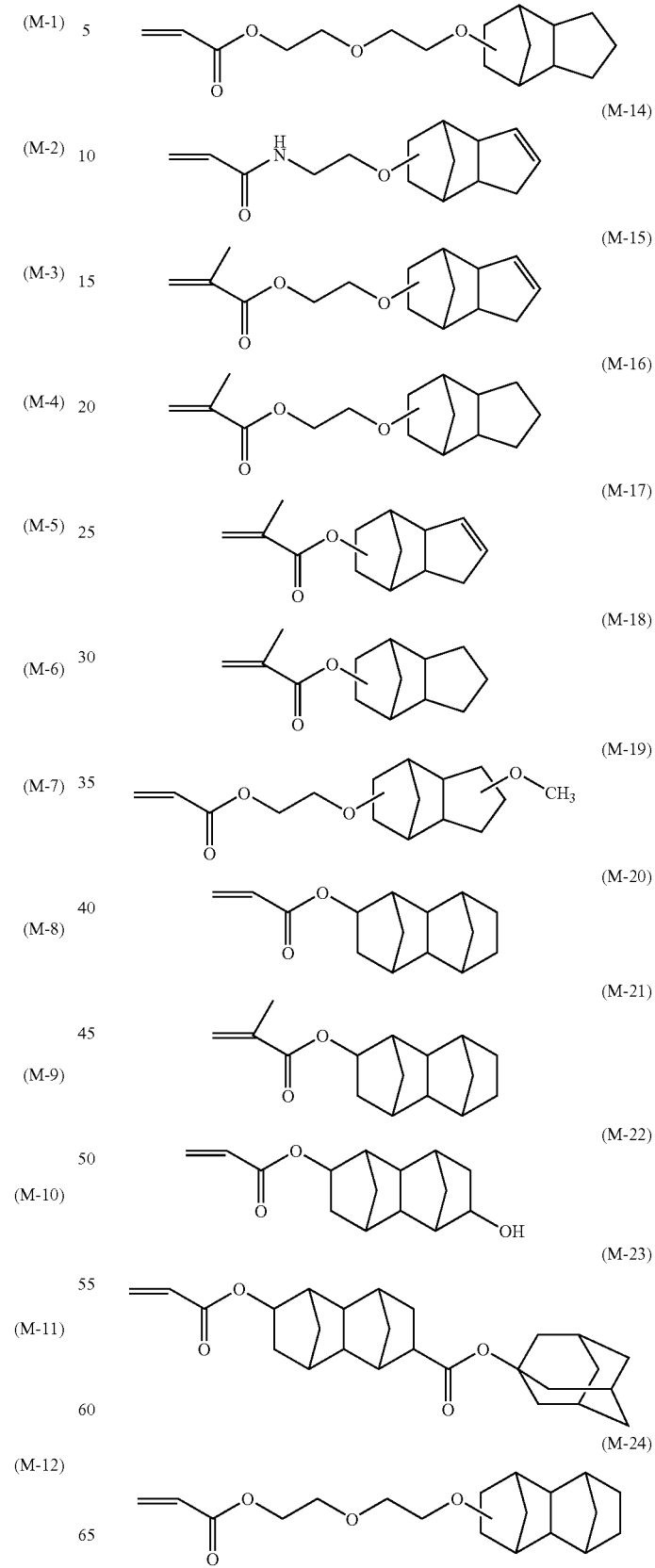

-continued
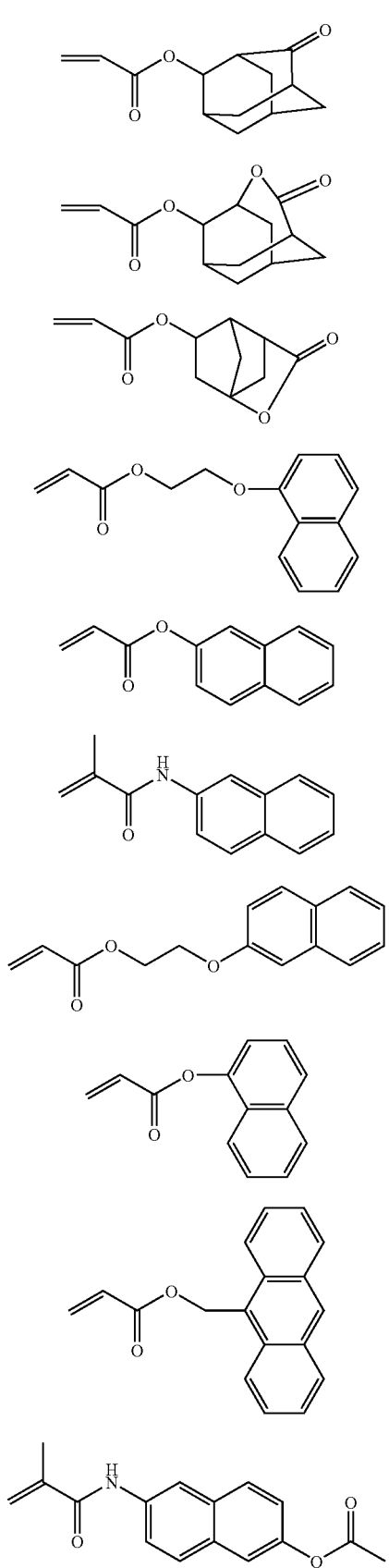
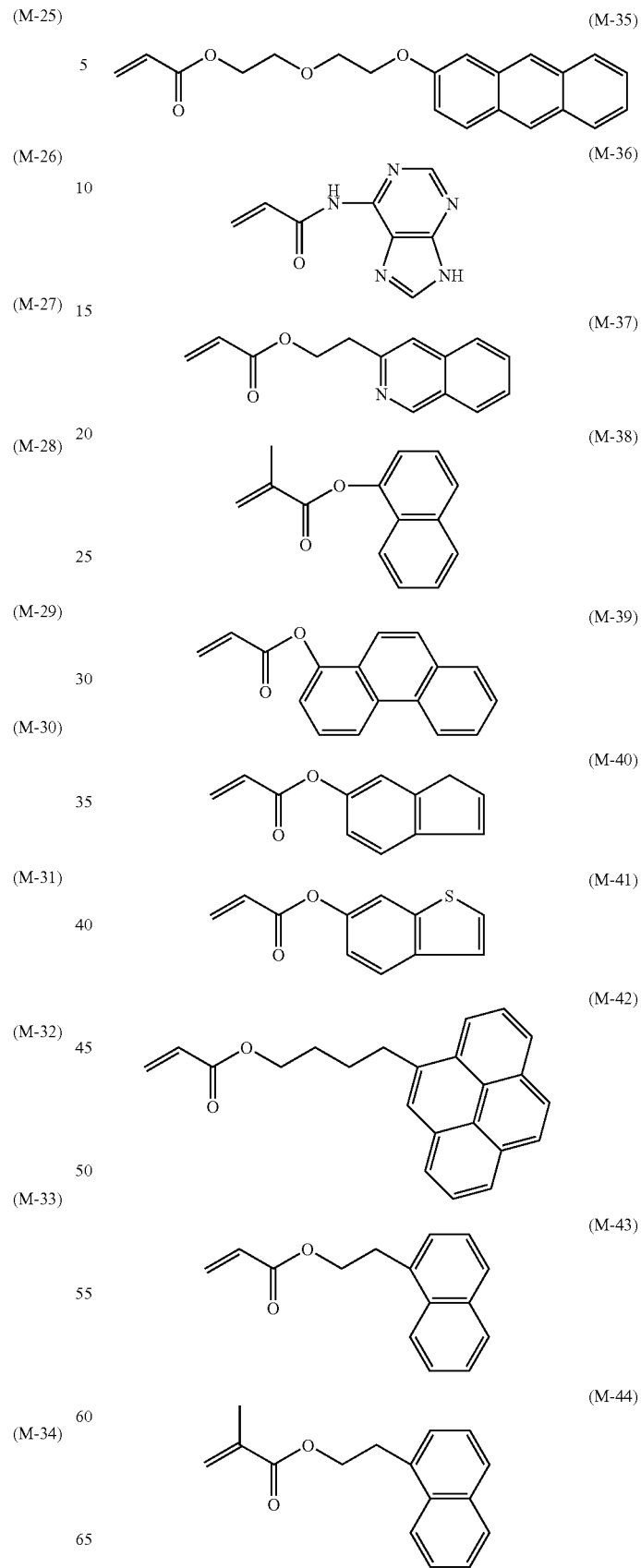

-continued (M-45) 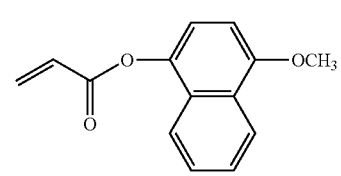

(M-46) 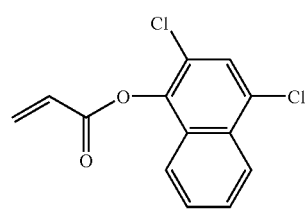

(M-47) 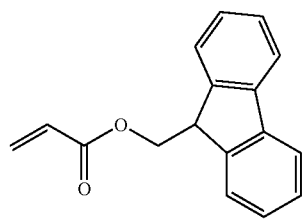

(M-48) 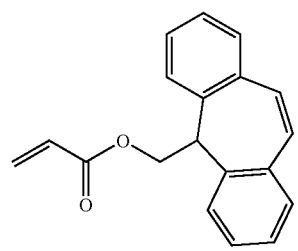

(M-49) 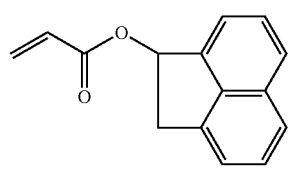

(M-50) 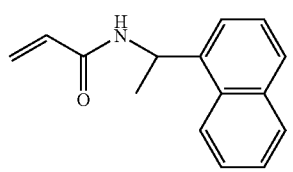

(M-51) 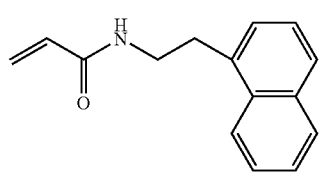

(M-52) 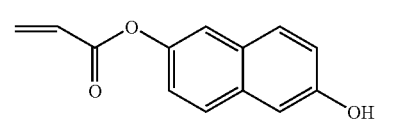

(M-53) 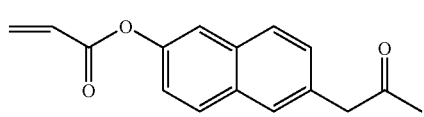

-continued (M-54) 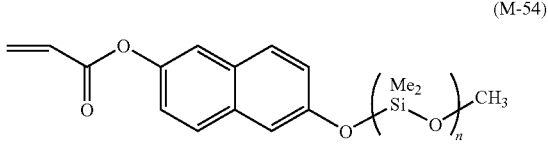

(M-55) 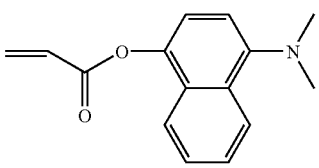

(M-56) 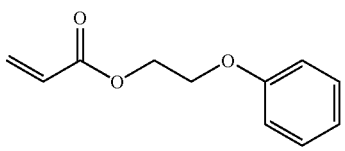

N-Vinyl Group-Containing Cyclic Monomer (Monofunctional N-Vinyl Compound)

In the present invention, as the monofunctional radically polymerizable monomer, it is preferable to use a monofunctional radically polymerizable monomer having an N-vinyl group and a cyclic structure-containing group. In particular, it is more preferable to use N-vinylcarbazole, 1-vinylimidazole, or an N-vinyllactam, and it is yet more preferable to use an N-vinyllactam.

Preferred examples of the N-vinyllactam that can be used in the present invention include compounds represented by Formula (2) below.

(2)

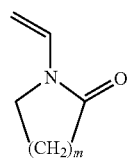

In Formula (2), m denotes an integer of 1 to 5; m is preferably an integer of 2 to 4 from the viewpoints of flexibility after the ink composition is cured, adhesion to a support or a recording medium, and starting material availability, m is more preferably 2 or 4, and m is particularly preferably 4, which is N-vinylcaprolactam. N-Vinylcaprolactam is preferable since it has excellent safety, is commonly used and easily available at a relatively low price, and gives particularly good ink curability and adhesion of a cured film to a support or a recording medium.

The N-vinyllactam may have a substituent such as an alkyl group or an aryl group on the lactam ring, and may have a saturated or unsaturated ring structure bonded thereto. The N-vinyllactam above may be contained in the ink composition singly or in a combination of a plurality of types.

In the present invention, it is preferable that an N-vinyl group-containing monofunctional cyclic monomer is contained at 5 wt % to 40 wt % of the total ink composition, more preferably 10 wt % to 35 wt %, and yet more preferably 12 wt % to 30 wt %. It is preferable for it to be in the above range since it shows good copolymerizability with another polymerizable compound, and an ink composition having excellent curability and blocking resistance is obtained.

In the present invention, the ink composition preferably comprises at least 60 wt %, relative to the ink composition, of the monofunctional radically polymerizable monomer having only one ethylenically unsaturated double bond group selected from the group consisting of an acryloyloxy group, a methacryloyloxy group, an acrylamide group, a methacrylamide group, a vinyloxy group, and an N-vinyl group and having at least one cyclic structure-containing group, more preferably comprises 60 to 90 wt %, and yet more preferably comprises 60 to 85 wt %. When the numerical value is within the above-mentioned range, the ink composition has appropriate viscosity and forms a cured coating that has a high level of stretchability that can allow deformation, has excellent curability, and has high abrasion resistance such that it does not stick to a mold and there are no scratches, cracks, or image dropouts during molding.

The ink composition of the present invention preferably comprises the monofunctional N-vinyllactam represented by Formula (2) at 5 to 40 wt % of the total ink composition, more preferably 10 to 35 wt %, and yet more preferably 12 to 30 wt %.

When the amount of monofunctional N-vinyllactam used is in the above-mentioned range, the curability, the flexibility of a cured coating, and the adhesion to a support of a cured coating are excellent. The N-vinyllactam is a compound having a relatively high melting point. It is preferable for the content of the N-vinyllactam to be no greater than 40 wt % since good solubility is exhibited even at a low temperature of 0° C. or less, and the temperature range in which the ink composition can be handled becomes large.

As the monofunctional radically polymerizable monomer, an acyclic monofunctional monomer described below may be used in combination. The acyclic monofunctional monomer has relatively low viscosity and may be used preferably for the purpose of, for example, decreasing the viscosity of the ink composition. However, from the viewpoint of suppressing tackiness of a cured coating and giving a high film strength so that scratches, etc. do not occur during molding, the proportion of the acyclic monofunctional monomer below in the total ink composition is preferably no greater than 20 wt %, and more preferably no greater than 15 wt %.

Specific examples include octyl(meth)acrylate, 2-ethylhexyl(meth)acrylate, decyl(meth)acrylate, dodecyl(meth)acrylate, tridecyl(meth)acrylate, tetradecyl(meth)acrylate, hexadecyl(meth)acrylate, 2-hydroxyethyl(meth)acrylate, butoxyethyl(meth)acrylate, carbitol(meth)acrylate, 2-ethylhexyl diglycol(meth)acrylate, polyethylene glycol(meth)acrylate monomethyl ether, polypropylene glycol(meth)acrylate monomethyl ether, and polytetraethylene glycol (meth)acrylate monomethyl ether.

Other than the above, examples also include (poly)ethylene glycol mono(meth)acrylate, (poly)ethylene glycol(meth)acrylate methyl ester, (poly)ethylene glycol(meth)acrylate ethyl ester, (poly)propylene glycol mono(meth)acrylate, (poly)propylene glycol(meth)acrylate methyl ester, and (poly)propylene glycol(meth)acrylate ethyl ester. Here, (meth)acrylate is an abbreviated expression denoting both acrylate and methacrylate.

Furthermore, examples include acrylic acid and acrylamide derivatives such as 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, butoxyethyl acrylate, oligoester acrylate, N-methylolacrylamide, and diacetone acrylamide.

Moreover, examples include methacrylic acid derivatives such as methyl methacrylate, n-butyl methacrylate, 2-ethylhexyl methacrylate, n-octyl methacrylate, n-nonyl methacrylate, n-decyl methacrylate, isooctyl methacrylate, n-lauryl methacrylate, n-tridecyl methacrylate, n-cetyl methacrylate, n-stearyl methacrylate, and dimethylaminomethyl methacrylate, and allyl compound derivatives such as allyl glycidyl ether.

Furthermore, examples include 2-ethylhexyl diglycol acrylate, 2-hydroxy-3-phenoxylpropyl acrylate, 2-hydroxybutyl acrylate, 2-acryloyloxyethylphthalic acid, 2-acryloyloxyethyl-2-hydroxyethylphthalic acid, ethoxylated phenyl acrylate, 2-acryloyloxyethylsuccinic acid, 2-acryloyloxyethylhexahydrophthalic acid, lactone-modified flexible acrylate, butoxyethyl acrylate, 2-hydroxyethyl acrylate, and methoxydipropylene glycol acrylate.

Polyfunctional Polymerizable Monomer

As the radically polymerizable monomer, a polyfunctional polymerizable monomer having two or more ethylenically unsaturated double bond groups selected from the group consisting of an acryloyloxy group, a methacryloyloxy group, an acrylamide group, a methacrylamide group, a vinyloxy group, and an N-vinyl group may be used in combination as necessary. Another polyfunctional monomer may be used. By containing a polyfunctional polymerizable monomer, an ink composition having a high cured coating strength is obtained. From the viewpoint of cured coating stretchability suitable for molding being maintained, the proportion of the polyfunctional polymerizable monomer in the polymerizable monomers is preferably no greater than 20 wt %.

Preferred examples of polyfunctional polymerizable monomers having a radically polymerizable ethylenically unsaturated bond include unsaturated carboxylic acids such as acrylic acid, methacrylic acid, itaconic acid, crotonic acid, isocrotonic acid, and maleic acid, and salts thereof, anhydrides having an ethylenically unsaturated group, acrylonitrile, styrene, and various types of unsaturated polyesters, unsaturated polyethers, unsaturated polyamides, and (meth) acrylic acid esters of unsaturated urethane(meth)acrylic monomers or prepolymers, epoxy monomers or prepolymers, or urethanes monomers or prepolymers, which are compounds having two or more ethylenically unsaturated double bonds.

Specific examples thereof include (meth)acrylic acid derivatives such as neopentyl glycol di(meth)acrylate, (poly) ethylene glycol di(meth)acrylate, (poly)tetramethylene glycol di(meth)acrylate, (poly)tetramethylene glycol di(meth) acrylate, bisphenol A PO adduct di(meth)acrylate, ethoxylated neopentyl glycol di(meth)acrylate, propoxylated neopentyl glycol di(meth)acrylate, bisphenol A EO adduct di(meth)acrylate, EO-modified pentaerythritol tri(meth) acrylate, PO-modified pentaerythritol tri(meth)acrylate, EO-modified pentaerythritol tetra(meth)acrylate, PO-modified pentaerythritol tetra(meth)acrylate, EO-modified dipentaerythritol tetra(meth)acrylate, PO-modified dipentaerythritol tetra(meth)acrylate, caprolactone-modified dipentaerythritol hexa(meth)acrylate, EO-modified trimethylolpropane tri(meth)acrylate, PO-modified trimethylolpropane tri(meth) acrylate, EO-modified tetramethylolmethane tetra(meth) acrylate, PO-modified tetramethylolmethane tetra(meth) acrylate, pentaerythritol tri(meth)acrylate, pentaerythritol tetra(meth)acrylate, dipentaerythritol tetra(meth)acrylate, trimethylolpropane tri(meth)acrylate, tetramethylolmethane tetra(meth)acrylate, tetramethylolmethane tetra(meth)acrylate, tetramethylolmethane tri(meth)acrylate, trimethylolethane tri(meth)acrylate, trimethylolpropane tri(meth)acrylate, 2,2-bis(4-(meth)acryloxypolyethoxyphenyl)propane, 1,6-hexanediol di(meth)acrylate, 1,9-nonanediol di(meth) acrylate, 1,10-decanediol di(meth)acrylate, hydroxypivalic acid neopentyl glycol di(meth)acrylate, tetramethylolmethane tri(meth)acrylate, dimethyloltricyclodecane di(meth)acrylate, modified glycerol tri(meth)acrylate, bisphenol A diglycidyl ether (meth)acrylic acid adduct, modified bisphenol A di(meth)acrylate, dipentaerythritol hexa(meth)acrylate, pentaerythritol tri(meth)acrylate tolylene diisocyanate urethane prepolymer, pentaerythritol tri(meth)acrylate hexamethylene diisocyanate urethane prepolymer, ditrimethylolpropane tetra(meth)acrylate, and pentaerythritol tri(meth)acrylate hexamethylene diisocyanate urethane prepolymer; allyl compound derivatives such as diallyl phthalate and triallyl trimellitate and, more specifically, commercial products, radically polymerizable or crosslinking monomers, oligomers, and polymers known in the art such as those described in 'Kakyozai Handobukku' (Crosslinking Agent Handbook), Ed. S. Yamashita (Taiseisha, 1981); 'UV•EB Koka Handobukku (Genryo)' (UV•EB Curing Handbook (Starting Materials)) Ed. K. Kato (Kobunshi Kankoukai, 1985); 'UV•EB Koka Gijutsu no Oyo to Shijyo' (Application and Market of UV•EB Curing Technology', p. 79, Ed. Rad Tech (CMC, 1989); and E. Takiyama 'Poriesuteru Jushi Handobukku' (Polyester Resin Handbook), (The Nikkan Kogyo Shimbun Ltd., 1988).

Among the (meth)acrylic acid derivatives above, from the viewpoint of excellent curability, acrylic acid derivatives are preferable.

Other specific examples include bis(4-(meth)acryloxy polyethoxyphenyl)propane, neopentyl glycol di(meth)acrylate, 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, and modified glycerol triacrylate.

Vinyl Ether Compound

Furthermore, as the radically polymerizable compound, a vinyl ether compound is preferably used. Examples of vinyl ether compounds that can suitably be used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether, and monovinyl ether compounds such as ethylene glycol monovinyl ether, triethylene glycol monovinyl ether, hydroxyethylmonovinyl ether, hydroxynonylmonovinyl ether, ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl vinyl ether, dodecyl vinyl ether, diethylene glycol monovinyl ether, and octadecyl vinyl ether. Here, the monovinyl ether compound can be used as a monofunctional vinyl oxy compound.

Among these vinyl ether compounds, divinyl ether compounds and trivinyl ether compounds are preferable from the viewpoint of curability, adhesion, and surface hardness, and divinyl ether compounds are particularly preferable. The vinyl ether compound may be used singly or in a combination of two or more types as appropriate.

In the present invention, the monomers listed above as the above-mentioned polymerizable compounds have high reactivity, low viscosity, and excellent adhesion to a recording medium.

The polymerizable monomer in each of the ink composition and the surface coating composition that can be used in the present invention is preferably 55 to 95 parts by weight relative to the total amount of the composition, more preferably 60 to 90 parts by weight, and yet more preferably 70 to 90 parts by weight. It is preferable for it to be in the above-mentioned range since the curability is excellent and the viscosity is appropriate.

(C) Radical Polymerization Initiator

As a radical polymerization initiator that can be used in the present invention, a known radical polymerization initiator may be used. The polymerization initiator that can be used in the present invention may be used singly or in a combination of two or more types. Furthermore, the radical polymerization initiator may be used in combination with a cationic polymerization initiator.

The polymerization initiator that can be used in the ink composition of the present invention is a compound that forms a polymerization initiating species by absorbing external energy. The external energy used for initiating polymerization can be broadly divided into heat and actinic radiation, and a thermal polymerization initiator and a photopolymerization initiator are used respectively. Examples of the actinic radiation include γ rays, β rays, an electron beam, ultraviolet rays, visible light, and infrared rays.

The ink composition of the present invention comprises at least one radical polymerization initiator and it is preferable to use a cationic polymerization initiator in combination when using a cationically polymerizable compound as a polymerizable compound in combination.

Radical Polymerization Initiator

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound. With regard to these radical polymerization initiators, the above-mentioned compounds (a) to (m) may be used singly or in combination. The radical polymerization initiator in the present invention may suitably be used singly or in a combination of two or more types.

Preferred examples of the aromatic ketone (a) and the thio compound (e) include a compound having a benzophenone skeleton (benzophenone compound) or a compound having a thioxanthone skeleton (thioxanthone compound) described in 'RADIATION CURING IN POLYMER SCIENCE AND TECHNOLOGY' J. P. FOUASSIER J. F. RABEK (1993), pp. 77 to 117. Preferred examples of the aromatic ketone (a), the acylphosphine compound (b) and the thio compound (e) include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561A1, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-5942864.

Examples of the benzophenone compound include benzophenone, 4-phenylbenzophenone, isophthalophenone, and 4-benzoyl-4'-methylphenylsulfide. Examples of the thioxanthone compound include 2,4-diethylthioxanthone, 2-isopropylthioxanthone, and 2-chlorothioxanthone.

In the present invention, the aromatic ketone (a) is preferably an α-hydroxyketone, and examples thereof include 1-[4-(2-hydroxyethoxy)phenyl]-2-hydroxy-2-methyl-1-propan-1-one, 2-hydroxy-2-methyl-1-phenylpropan-1-one, and 1-hydroxycyclohexyl phenyl ketone.

Among them, the aromatic ketone (a) is particularly preferably a 1-hydroxycyclohexyl phenyl ketone compound. The 1-hydroxycyclohexyl phenyl ketone compound referred to in the present invention means 1-hydroxycyclohexyl phenyl ketone and a compound obtained by substituting 1-hydroxycyclohexyl phenyl ketone with any substituent. The substituent may be selected freely from a range that enables an ability as a radical polymerization initiator to be exhibited, and specific examples thereof include an alkyl group (e.g. a methyl group, an ethyl group, a propyl group, a butyl group, etc.).

In the present invention, the acylphosphine compound (b) is preferably an acylphosphine oxide compound.

Examples of the acylphosphine oxide compound include a compound having a structure represented by Formula (7) or (8).

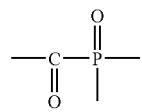

Formula (7)

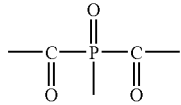

Formula (8)

The acylphosphine oxide compound is particularly preferably one having a chemical structure represented by Formula (9) or (10).

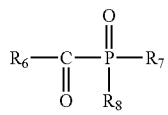

Formula (9)

(In the formulae, $R_6$, $R_7$, and $R_8$ denote an aromatic hydrocarbon group, which may have a methyl group or an ethyl group as a substituent.)

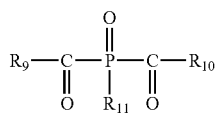

Formula (10)

(In the formulae, $R_9$, $R_{10}$, and $R_{11}$ denote an aromatic hydrocarbon group, which may have a methyl group or an ethyl group as a substituent.)

As the acylphosphine oxide compound, a monoacylphosphine oxide compound, a bisacylphosphine oxide compound, etc. may be used, and as the monoacylphosphine oxide compound, a known monoacylphosphine oxide compound may be used. Examples thereof include monoacylphosphine oxide compounds described in JP-B-60-8047 and JP-B-63-40799. Specific examples thereof include methyl isobutyrylmethylphosphinate, methyl isobutyrylphenylphosphinate, methyl o-pivaloylphenylphosphinate, methyl 2-ethylhexanoylphenylphosphinate, isopropyl pivaloylphenylphosphinate, methyl p-tolylphenylphosphinate, methyl o-tolylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-tolyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoyl-bis-diphenylphosphine oxide, pivaloyldiphenylphosphine oxide, p-tolyldiphenylphosphine oxide, 4-(t-butyl)benzoyldiphenylphosphine oxide, terephthaloyl-bis-diphenylphosphine oxide, 2-methylbenzoyldiphenylphosphine oxide, versatoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound, a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

Among them, preferred examples of the acylphosphine oxide compound in the present invention include bis(2,4,6-trimethylbenzoyl)phenylphosphine oxide (Irgacure 819: manufactured by Ciba Specialty Chemicals), bis(2,6-dimethoxybenzoyl)-2,4,4-trimethylpentylphenylphosphine oxide, and 2,4,6-trimethylbenzoyldiphenylphosphine oxide (Darocur TPO: manufactured by Ciba Specialty Chemicals, Lucirin TPO: manufactured by BASF).

As the aromatic onium salt compound (c), there can be cited aromatic onium salts of elements of Groups 15, 16, and 17 of the periodic table, specifically, N, P, As, Sb, Bi, O, S, Se, Te, and I. Examples thereof include iodonium salts described in EP No. 104143, U.S. Pat. No. 4,837,124, JP-A-2-150848, and JP-A-2-96514, diazonium salts (optionally substituted benzenediazoniums, etc.) described in EP Nos. 370693, 233567, 297443, 297442, 279210, and 422570, U.S. Pat. Nos. 3,902,144, 4,933,377, 4,760,013, 4,734,444, and 2,833,827, diazonium salt resins (diazodiphenylamine formaldehyde resins, etc.), N-alkoxypyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate); furthermore, compounds described in JP-B-52-147277, 52-14278, and 52-14279 may suitably be used. A radical or an acid is formed as an active species.

As the organic peroxide (d), almost all organic compounds having at least one oxygen-oxygen bond per molecule can be cited, and preferred examples thereof include peroxide ester compounds such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, and di-t-butyldiperoxyisophthalate.

As the hexaarylbiimidazole compound (f), there can be cited lophine dimers described in JP-B-45-37377 and JP-B-44-86516, and examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4',5,5'-tetraphenylbiimidazole.

As the ketoxime ester compound (g), there can be cited 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compound (h) include compounds described in U.S. Pat. Nos. 3,567,453 and 4,343,891, and EP Nos. 109,772 and 109,773.

Examples of the azinium salt compound (i) include N—O bond-containing compounds described in JP-A-63-138345, JP-A-63-142345, JP-A-63-142346, JP-A-63-143537, and JP-B-46-42363.

Examples of the metallocene compound (j) include titanocene compounds described in JP-A-59-152396, JP-A-61-151197, JP-A-63-41484, JP-A-2-249, and JP-A-24705, and iron-arene complexes described JP-A-1-304453 and JP-A-1-152109.

Specific examples of the titanocene compound include dicyclopentadienyl-Ti-dichloride, dicyclopentadienyl-Ti-bis-phenyl, di-cyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-2,6-difluorophen-1-yl, dicyclopentadienyl-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)-bis(2,6-difluoro-3-(pyrr-1-yl)phenyl)titanium, bis(cyclopentadienyl)bis[2,6-difluoro-3-(methylsulfonamido)phenyl]titanium, and bis(cyclopentadienyl)bis[2,6-difluoro-3-(N-butylbiaroylamino)phenyl]titanium.

Examples of the active ester compound (k) include nitrobenzyl ester compounds described in EP Nos. 0290750, 046083, 156153, 271851, and 0388343, U.S. Pat. Nos. 3,901,710 and 4,181,531, JP-A-60-198538, and JP-A-53-133022, iminosulfonate compounds described in EP Nos. 0199672, 84515, 199672, 044115, and 0101122, U.S. Pat. Nos. 4,618,564, 4,371,605, and 4,431,774, JP-A-64-18143, JP-A-2-245756, and JP-A-4-365048, and compounds described in JP-B-62-6223, JP-B-63-14340, and JP-A-59-174831.

Preferred examples of the compound (l) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

The ink composition of the present invention preferably comprises an acylphosphine oxide compound; it is preferable to use in combination an acylphosphine compound and a benzophenone compound or thioxanthone compound, and it is more preferable to use in combination an acylphosphine compound and an α-aminoketone compound. It is particularly preferable to use in combination an acylphosphine compound and a benzophenone compound. Due to the above-mentioned combination, an ink composition having excellent curability and anti-blocking properties can be obtained.

Cationic Polymerization Initiator

When a cationically polymerizable compound is used in the present invention, it is preferable to use the radical polymerization initiator in combination with a cationic polymerization initiator. Examples of the cationic polymerization initiator (photo-acid generator) that can be used in the present invention include chemically amplified photoresists and compounds used in cationic photopolymerization ('Imejingu you Yukizairyou' (Organic Materials for Imaging), Ed. The Japanese Research Association for Organic Electronics Materials, Bunshin Publishing Co. (1993), pp. 187-192).

Firstly, $B(C_6F_5)_4^-$, $PF_6^-$, $AsF_6^-$, $SbF_6^-$, and $CF_3SO_3^-$ salts of diazonium, ammonium, iodonium, sulfonium, phosphonium, etc. aromatic onium compounds can be cited. Secondly, sulfonated materials that generate a sulfonic acid can be cited. Thirdly, halides that photogenerate a hydrogen halide can also be used. Fourthly, iron arene complexes can be cited.

In the ink composition of the present invention, the total amount of polymerization initiator used is preferably 0.01 to 35 wt % relative to the total amount of polymerizable compound used, more preferably 0.5 to 20 wt %, and yet more preferably 1.0 to 15 wt %. The ink composition can be cured sufficiently with 0.01 wt % or greater of the polymerization initiator, and a cured film having a uniform degree of curing can be obtained with 35 wt % or less.

Furthermore, when a sensitizer, which will be described later, is used in the ink composition of the present invention, the total amount of polymerization initiator used is preferably 200:1 to 1:200 relative to the sensitizer as a ratio by weight of polymerization initiator: sensitizer, more preferably 50:1 to 1:50, and yet more preferably 20:1 to 1:5.

(D) Colorant

In the present invention, the ink composition may contain a colorant in order to improve the visibility of a formed image area.

The coloring agent that can be used in the present invention is not particularly limited, but a pigment and an oil-soluble dye that have excellent weather resistance and rich color reproduction are preferable, and it may be selected from any known coloring agent such as a soluble dye. It is preferable that the coloring agent that can be suitably used in the ink composition or the inkjet recording ink composition of the present invention does not function as a polymerization inhibitor in a polymerization reaction, which is a curing reaction. This is because the sensitivity of the curing reaction by actinic radiation should not be degraded.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193; as a black pigment, Pigment Black 7, 28, or 26; as a white pigment, Pigment White 6, 18, or 21, etc. may be used according to the intended application.

The oil-soluble dye that can be used in the present invention is explained below.

The oil-soluble dye that can be used in the present invention means a dye that is substantially insoluble in water. Specifically, the solubility in water at 25° C. (the mass of dye that can be dissolved in 100 g of water) is no greater than 1 g, preferably no greater than 0.5 g, and more preferably no greater than 0.1 g. Therefore, the oil-soluble dye means a so-called water-insoluble pigment or an oil-soluble dye, and among these the oil-soluble dye is preferable.

Among the oil-soluble dyes that can be used in the present invention, as a yellow dye, any may be used. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Among the above-mentioned oil-soluble dyes that can be used in the present invention, as a magenta dye, any may be used. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Among the oil-soluble dyes that can be used in the present invention, as a cyan dye, any may be, used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit respective colors of yellow, magenta, and cyan only after a part of the chromophore dissociates, and in that case the counter cation may be an inorganic cation such as an alkali metal or ammonium, may be an organic cation such as pyridinium or a quaternary ammonium salt, or may be a polymer cation having the above cation as a partial structure.

Although not limited to the following, preferred specific examples thereof include CI Solvent Black 3, 7, 27, 29, and 34; CI Solvent Yellow 14, 16, 19, 29, 30, 56, 82, 93, and 162; CI Solvent Red 1, 3, 8, 18, 24, 27, 43, 49, 51, 72, 73, 109, 122, 132, and 218; CI Solvent Violet 3; CI Solvent Blue 2, 11, 25, 35, 38, 67, and 70; CI Solvent Green 3 and 7; and CI Solvent Orange 2.

Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, and Neopen Cyan FF4238 (manufactured by BASF).

In the present invention, the oil-soluble dye may be used singly or in a combination of two or more types.

Furthermore, when the oil soluble dye is used as a colorant, another colorant such as a water-soluble dye, a disperse dye, or a pigment may be contained as necessary in a range that does not interfere with the effects of the present invention.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent. Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

The colorant that can be used in the present invention is preferably added to the ink composition or the inkjet recording ink composition of the present invention and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition of the present invention, but in order to improve dispersibility it may be added in advance to a solvent or a dispersing medium such as a radically polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a radically polymerizable compound. As a polymerizable compound used, it is preferable in terms of dispersion suitability to select a monomer having the lowest viscosity.

These colorants may be used by appropriately selecting one type or two or more types according to the intended purpose of the ink composition.

When a colorant such as a pigment that is present as a solid in the ink composition of the present invention is used, it is preferable for the colorant, the dispersant, the dispersing medium, dispersion conditions, and filtration conditions to be set so that the average particle size of colorant particles is preferably 0.005 to 0.5 μm, more preferably 0.01 to 0.45 μm, and yet more preferably 0.015 to 0.4 μm. By such control of particle size, clogging of a head nozzle can be suppressed, and the ink storage stability, the ink transparency, and the curing sensitivity can be maintained.

The content of the colorant in the ink composition of the present invention is appropriately selected according to the color and the intended purpose, and is preferably 0.01 to 30 wt % relative to the weight of the entire ink composition.

In the present invention, with regard to the ratio by weight of the dispersant relative to the pigment, when the weight of the pigment in the ink composition is P and the weight of the dispersant in the ink composition is R, the ratio by weight (R/P) is $0.05 < R/P \leq 15$, preferably $0.1 \leq R/P \leq 10$, and more preferably $0.1 \leq R/P \leq 5$. When the ratio by weight of the dispersant relative to the pigment exceeds 0.5, after being stored over time there is no aggregation/precipitation of the pigment, the ink viscosity does not increase, and an ink composition having excellent storage stability over time can thus be obtained. Furthermore, when the ratio is 15 or less, an ink composition having a low ink viscosity and excellent discharge properties can be obtained.

(E) Dispersant

The ink composition of the present invention comprises a dispersant in order to stably disperse the pigment in the ink composition.

As the dispersant that can be used in the present invention, a polymeric dispersant is preferable. The 'polymeric dispersant' referred to in the present invention means a dispersant having a weight-average molecular weight of 1,000 or greater.

Examples of the polymeric dispersant include polymeric dispersants such as DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (all manufactured by EFKA Additives), Disperse Aid 6, Disperse Aid 8, Disperse Aid 15, and Disperse Aid 9100 (manufactured by San Nopco Limited); various types of Solsperse dispersants such as Solsperse 3000, 5000, 9000, 12000, 13240, 13940, 17000, 22000, 24000, 26000, 28000, 32000, 36000, 39000, 41000, and 71000 (manufactured by Avecia); Adeka Pluronic L31, F38, L42, L44, L61, L64, F68, L72, P95, F77, P84, F87, P94, L101, P103, F108, L121, and P-123 (manufactured by Adeka Corporation), Isonet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the ink composition of the present invention is appropriately selected according to the intended purpose, and is generally preferably 0.05 to 15 wt % relative to the weight of the entire ink composition.

(F) Other Component

The ink composition of the present invention may comprise another component as necessary.

Examples of the other component include a sensitizer, a cosensitizer, another polymerizable compound, a surfactant, a UV absorber, an antioxidant, an antifading agent, a conductive salt, a solvent, a polymer compound, and a basic compound.

Sensitizer

The ink composition of the present invention may contain a sensitizer in order to promote decomposition of the above-mentioned polymerization initiator by absorbing specific actinic radiation, in particular when used for inkjet recording. The sensitizer absorbs specific actinic radiation and attains an electronically excited state. The sensitizer in the electronically excited state causes actions such as electron transfer, energy transfer, or heat generation upon contact with the polymerization initiator. This causes the polymerization initiator to undergo a chemical change and decompose, thus forming a radical, an acid, or a base.

As a sensitizer in the ink composition of the present invention, it is preferable to use a sensitizing dye.

Preferred examples of the sensitizing dye include those that belong to compounds below and have an adsorption wavelength in the region of 350 nm to 450 nm.

Polynuclear aromatic compounds (e.g. pyrene, perylene, triphenylene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

Preferred examples of the sensitizing dye include compounds represented by Formulae (IX) to (XIII) below.

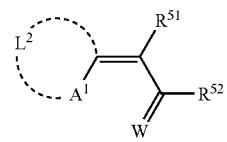

(IX)

In Formula (IX), $A^1$ denotes a sulfur atom or $NR^{50}$, $R^{50}$ denotes an alkyl group or an aryl group, $L^2$ denotes a non-metallic atomic group forming a basic nucleus of a dye in cooperation with a neighboring $A^1$ and the neighboring carbon atom, $R^{51}$ and $R^{52}$ independently denote a hydrogen atom or a monovalent non-metallic atomic group, and $R^{51}$ and $R^{52}$ may be bonded together to form an acidic nucleus of a dye. W denotes an oxygen atom or a sulfur atom.

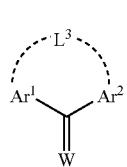
(X)

In Formula (X), Ar$^1$ and Ar$^2$ independently denote an aryl group and are connected to each other via a bond of -L$^3$-. Here, L$^3$ denotes —O— or —S—. W has the same meaning as that shown in Formula (IX).

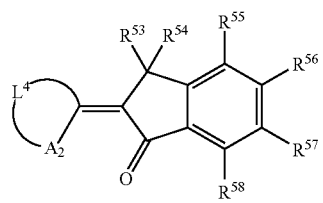
(XI)

In Formula (XI), A$_2$ denotes a sulfur atom or NR$^{59}$, L$^4$ denotes a non-metallic atomic group forming a basic nucleus of a dye in cooperation with the neighboring A$_2$ and carbon atom, R$^{53}$, R$^{54}$, R$^{55}$, R$^{56}$, R$^{57}$, and R$^{58}$ independently denote a monovalent non-metallic atomic group, and R$^{59}$ denotes an alkyl group or an aryl group.

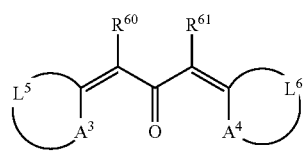
(XII)

In Formula (XII), A$^3$ and A$^4$ independently denote —S—, —NR$^{62}$—, or —NR$^{63}$—, R$^{62}$ and R$^{63}$ independently denote a substituted or unsubstituted alkyl group, or a substituted or unsubstituted aryl group, L$^5$ and L$^6$ independently denote a non-metallic atomic group forming a basic nucleus of a dye in cooperation with the neighboring A$^3$ and A$^4$ and neighboring carbon atom, and R$^{60}$ and R$^{61}$ independently denote a hydrogen atom or a monovalent non-metallic atomic group, or are bonded to each other to form an aliphatic or aromatic ring.

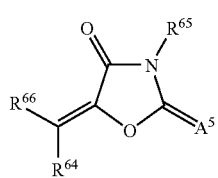
(XIII)

In Formula (XIII), R$^{66}$ denotes an aromatic ring or a hetero ring, which may have a substituent, and A$^5$ denotes an oxygen atom, a sulfur atom, or —NR$^{67}$—. R$^{64}$, R$^{65}$, and R$^{67}$ independently denote a hydrogen atom or a monovalent non-metallic atomic group, and R$^{67}$ and R$^{64}$, and R$^{65}$ and R$^{67}$ may be bonded to each other to form an aliphatic or aromatic ring.

Specific examples of the compounds represented by Formulae (IX) to (XIII) include (E-1) to (E-20) listed below.

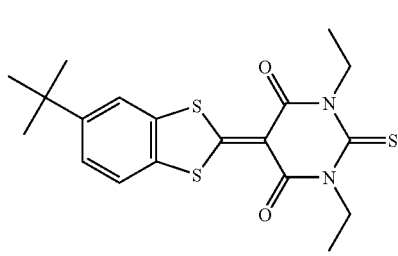
(E-1)

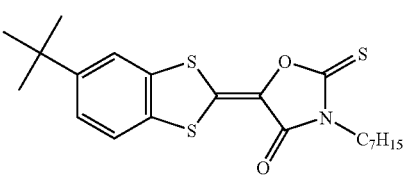
(E-2)

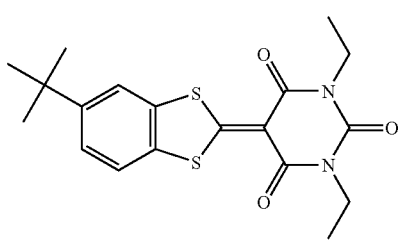
(E-3)

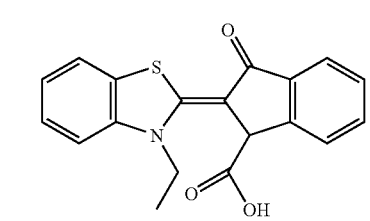
(E-4)

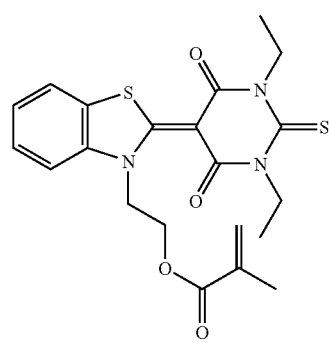
(E-5)

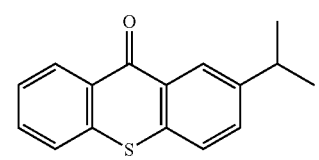
(E-6)

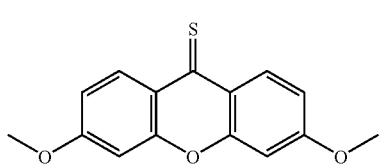
(E-7)

-continued

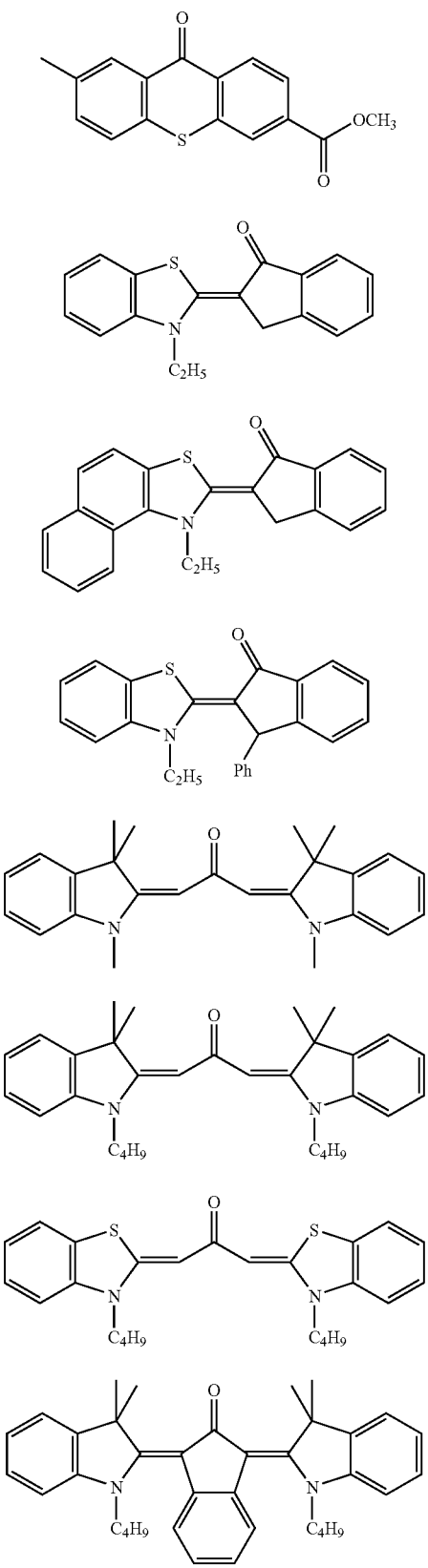

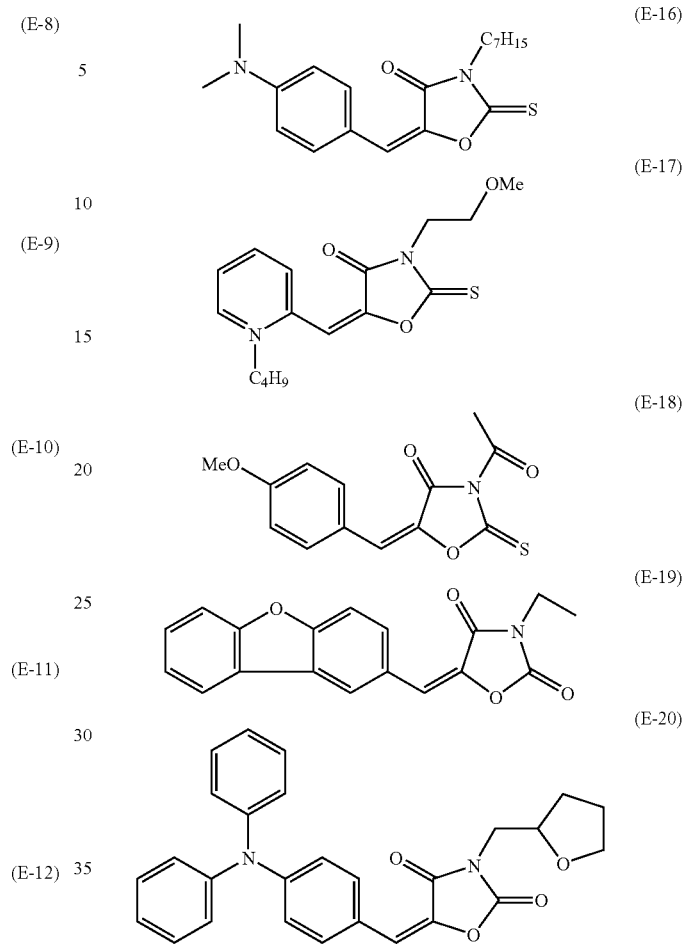

The content of the sensitizer in the ink composition of the present invention is appropriately selected according to the intended purpose, but it is generally preferably 0.05 to 4 wt % relative to the weight of the entire ink composition.

Cosensitizer

The ink composition of the present invention preferably comprises a cosensitizer. In the present invention, the cosensitizer has the function of further improving the sensitivity of the sensitizing dye to actinic radiation or the function of suppressing inhibition by oxygen of polymerization of a polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H, Ge—H compounds described in JP-A-8-54735.

The content of the cosensitizer in the ink composition of the present invention is appropriately selected according to the intended purpose, but it is generally preferably 0.05 to 4 wt % relative to the weight of the entire ink composition.

Surfactant

It is preferable to add a surfactant to the ink composition of the present invention in order to impart long-term discharge stability.

As the surfactant, those described in JP-A-62-173463 and 62-183457 can be cited. Examples thereof include anionic surfactants such as dialkylsulfosuccinic acid salts, alkylnaphthalene sulfonic acid salts, and fatty acid salts, nonionic surfactants such as polyoxyethylene alkyl ethers, polyoxyethylene alkyl aryl ethers, acetylene glycols, and polyoxyethylene/polyoxypropylene block copolymers, and cationic surfactants such as alkylamine salts and quaternary ammonium salts.

UV Absorber

A UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 wt % on the basis of the solids content in the ink composition.

Antioxidant

In order to improve the stability of the ink composition, an antioxidant may be added. Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is preferably on the order of 0.1 to 8 wt % on the basis of the solids content in the ink composition.

Antifading Agent

The ink composition of the present invention may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-21572, pages 127 to 137.

The amount thereof added is appropriately selected according to the intended application, and it is preferably on the order of 0.1 to 8 wt % on the basis of the solids content in the ink composition.

Conductive Salt

The ink composition of the present invention may contain, for the purpose of controlling discharge properties, a conductive salt such as potassium thiocyanate, lithium nitrate, ammonium thiocyanate, or dimethylamine hydrochloride.

Solvent

It is also effective to add a trace amount of organic solvent to the ink composition of the present invention in order to improve the adhesion to a recording medium.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC, and the amount is preferably in the range of 0.1 to 5 wt % relative to the total amount of the ink composition, and more preferably 0.1 to 3 wt %.

High Molecular Weight Compound

The ink composition may contain various types of high molecular weight compounds in order to adjust film physical properties. Examples of the high molecular weight compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinylic resins, acrylic resins, rubber-based resins, waxes, and other natural resins. They may be used in a combination of two or more types. Among these, a vinylic copolymer obtained by copolymerization of an acrylic monomer is preferable. Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

Basic Compound

The basic compound is preferably added from the viewpoint of improving the storage stability of the ink composition. A basic compound that can be used in the present invention is a known basic compound, and preferred examples thereof include a basic inorganic compound such as an inorganic salt or a basic organic compound such as an amine.

In addition to the above, the composition may contain as necessary, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth) acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Properties of Ink Composition

In the present invention, the ink composition has a viscosity at 25° C. of preferably no more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature is set to be high, even when a porous recording medium is used, penetration of the ink into the recording medium can be prevented, and uncured monomer can be reduced. Furthermore, ink spreading when ink droplets have landed can be suppressed, and as a result there is the advantage that the image quality is improved.

The surface tension of the ink composition of the present invention at 25° C. is preferably 20 to 35 mN/m, and more preferably 23 to 33 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 35 mN/m.

(2) Inkjet Recording Method, Inkjet Recording Device, Printed Material, and Process for Producing a Molded Printed Material The ink composition of the present invention is used for inkjet recording.

The inkjet recording method of the present invention is a method for forming an image by discharging the ink composition of the present invention onto a recording medium (support, recording material, etc.) for inkjet recording and curing the ink by irradiating the ink composition so discharged onto the recording medium with actinic radiation.

More particularly, the inkjet recording method of the present invention comprises ($a^1$) a step of discharging the ink composition of the present invention onto a recording medium and ($b^1$) a step of curing the ink composition by irradiating the ink composition so discharged with actinic radiation, The inkjet recording method of the present invention comprises the steps ($a^1$) and ($b^1$) above and thus forms an image from the ink composition cured on the recording medium.

The printed material of the present invention is a printed material recorded by the inkjet recording method of the present invention.

Furthermore, the ink composition of the present invention is suitably used when forming an image by an inkjet method on a support that is subjected to molding. By molding a printed material obtained by the inkjet recording method, a molded printed material can be produced.

More particularly, the process for producing a molded printed material of the present invention comprises ($a^2$) a step of forming an image by discharging the ink composition of the present invention onto a support by an inkjet method, ($b^2$) a step of irradiating the image thus obtained with actinic radiation so as to cure the ink composition and obtain a printed material having the image cured on the support, and ($c^2$) a step of molding the printed material. The molding is preferably embossing, vacuum forming, pressure forming, or vacuum/pressure forming.

Recording Medium and Support

In the present invention, the recording medium is not particularly limited, and a recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

A support that can be used in the present invention is not particularly limited, and a known recording medium may be used. In case of molding a printed material, a known recording medium suitable for molding can be used and it is described below.

Examples of the support include polyolefin-based resins such as polyethylene, polypropylene, polymethylpentene, polybutene, and an olefin-based thermoplastic elastomer, polyester resins such as polyethylene terephthalate, polybutylene terephthalate, polyethylene naphthalate, a terephthalic acid-isophthalic acid-ethylene glycol copolymer, a terephthalic acid-ethylene glycol-1,4-cyclohexanedimethanol copolymer, and a polyester-based thermoplastic elastomer, polyamide resins such as nylon-6, nylon-9, and nylon-66, fluorine-based resins such as polyvinyl fluoride, polyvinylidene fluoride, polyvinylidene trifluoride, an ethylene-ethylene tetrafluoride copolymer, and polyethylene tetrafluoride, an acrylic-based resin, polyvinyl chloride, polystyrene, and a polycarbonate resin.

With regard to the acrylic-based resin, for example, a resin such as polymethyl(meth)acrylate, polyethyl(meth)acrylate, polybutyl(meth)acrylate, a methyl(meth)acrylate-butyl (meth)acrylate copolymer, an ethyl(meth)acrylate-butyl (meth)acrylate copolymer, or a methyl(meth)acrylate-styrene copolymer (the term (meth)acrylate means acrylate or methacrylate) may be used singly or in a combination of two or more types.

In particular, from the viewpoint of molding being easy and various resistance properties of a finished molded printed material being excellent, it is preferable to use polyethylene terephthalate, a polycarbonate resin, or a resin formed by blending a polycarbonate resin with another resin.

The thickness of a thermoplastic resin sheet used as the support in the present invention (the total thickness in the case of a laminate structure) is not particularly limited as long as it is a resin sheet having a thickness in a range that allows vacuum and pressure forming employing the principles of embossing, vacuum forming, pressure forming, and vacuum/pressure forming to be carried out, and it is preferably 50 to 1,000 μm, more preferably 70 to 800 μm, and yet more preferably 100 to 500 μm.

It is appropriately selected from thermoplastic resin sheets while taking into consideration suitability for embossing in terms of giving a high gloss region, a low gloss region, and a variation in sheet thickness and, moreover, a balance between molding suitability and embossing durability (preventing disappearance of embossing) due to heat during molding when a printed material is thermally softened and molded by vacuum forming, etc. The layer structure of a transparent resin substrate sheet may be a single layer or a laminate in which two or more layers of different types of resin are laminated.

It is possible to add an appropriate additive to the thermoplastic resin sheets as necessary. As the additive, various types of additive may be added in an appropriate amount such that they do not impair surface gloss or thermal behavior such as melting point. Examples thereof include a photostabilizer such as a benzotriazole-based, benzophenone-based, etc. UV absorber or a hindered amine-based radical scavenger, a lubricant such as a silicone resin or a wax, a colorant, a plasticizer, a heat stabilizer, an antimicrobial agent, an antimold agent, and an antistatic agent.

The molded printed material of the present invention may be produced by subjecting the thermoplastic resin sheet to vacuum forming, etc., and an image is formed on the support by the inkjet method prior to molding. An image is generally formed on the reverse side of a transparent sheet (side facing the mold in vacuum forming), but an image may also be formed on the opposite side. It is also possible to form an image only on said opposite side depending on the circumstances, and in this case the thermoplastic resin sheet used as a substrate is not necessarily transparent.

The steps ($a^1$) and ($a^2$) of the inkjet recording method of the present invention may employ an inkjet recording device that will be described in detail below.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink onto a recording medium in step ($a^1$) of the inkjet recording method of the present invention and step ($a^2$) of the process for producing a molded printed material.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink supply tank immediately before an inkjet head, a filter, and a piezo system inkjet head. The piezo system inkjet head may be driven so as to discharge a multisize dot of preferably 1 to 100 pL, and more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, since it is desirable for the radiation curing type ink to be discharged at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition or the inkjet recording ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since a good discharge stability can be obtained. By employing this method, high discharge stability can be realized.

The radiation curing type ink composition such as the ink composition of the present invention generally has a viscosity that is higher than that of a normal ink composition or a water-based ink used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the ink discharge temperature as constant as possible. In the present invention, the control range for the temperature is preferably ±5° C. of a set temperature, more preferably ±2° C. of the set temperature, and yet more preferably ±1° C. of the set temperature.

The step ($b^1$) of curing the discharged ink composition by irradiating the ink composition with actinic radiation and the step ($b^2$) of irradiating the image thus obtained with actinic radiation so as to cure the ink composition and obtain a printed material having the image cured on the support are now explained.

The ink composition discharged onto the recording medium or onto the support cures upon exposure to actinic radiation. This is due to an initiating species such as a radical being generated by decomposition of the radical polymerization initiator contained in the ink composition of the present invention by irradiation with actinic radiation, the initiating species functioning so as to make a polymerization reaction of a radically polymerizable compound take place and to promote it. In this process, if a sensitizing colorant is present together with the polymerization initiator in the ink composition, the sensitizing colorant in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizing dye, the peak wavelength of the actinic radiation is, for example, 200 to 600 nm, preferably 300 to 450 nm, and more preferably 350 to 420 nm.

Furthermore, in the present invention, the polymerization initiation system has sufficient sensitivity for low output actinic radiation. The actinic radiation is applied therefore so that the illumination intensity on the exposed surface is, for example, 10 to 4,000 mW/cm$^2$, and preferably 20 to 2,500 mW/cm$^2$.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV-light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

The ink composition of the present invention is desirably exposed to such actinic radiation for, for example, 0.01 to 120 sec., and preferably 0.1 to 90 sec.

Irradiation conditions and a basic method for irradiation with actinic radiation are disclosed in JP-A-60-132767. Specifically, a light source is provided on either side of a head unit that includes an ink discharge device, and the head unit and the light source are made to scan by a so-called shuttle system. Irradiation with actinic radiation is carried out after a certain time (e.g. 0.01 to 0.5 sec., preferably 0.01 to 0.3 sec., and more preferably 0.01 to 0.15 sec.) has elapsed from when the ink has landed. By controlling the time from ink landing to irradiation so as to be a minimum in this way, it becomes possible to prevent the ink that has landed on a recording medium from spreading before being cured. Furthermore, since the ink can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a recording method, it is possible to maintain a uniform dot diameter for landed ink even for various types of recording media having different surface wettability, thereby improving the image quality. In order to obtain a color image, it is preferable to superimpose colors in order from those with a low lightness. By superimposing inks in order from one with low lightness, it is easy for radiation to reach a lower ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

Ink Set

The inkjet recording method and the process for producing a molded printed material of the present invention may suitably employ the ink set comprising at least one ink composition of the present invention. The order in which colored ink compositions are discharged is not particularly limited, but it is preferable to apply to a recording medium from a colored ink composition having a low lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta, cyan, magenta, black, white, and yellow dark ink compositions may preferably be used, and in this case they are applied on top of the recording medium in the order white→light cyan→light magenta→yellow→cyan→magenta→black.

In this way, the ink composition of the present invention is cured by irradiation with actinic radiation in high sensitivity to thus form an image on the surface of the recording medium.

When using as an ink set comprising plurality of ink compositions having a different color, the ink set is not particularly limited as long as it is an ink set having two or more types of ink compositions in combination, the ink set comprising in combination at least one ink composition of the present invention and another ink composition of the present invention or an ink composition other than one of the present invention, and it is preferable for the ink set to comprise at least one ink composition of the present invention having a color selected from cyan, magenta, yellow, black, white, light magenta, and light cyan.

Furthermore, the ink set of the present invention may be suitably used in the inkjet recording method of the present invention.

In order to obtain a full color image using the ink composition of the present invention, it is preferable to use, as the ink set of the present invention, an ink set comprising at least four dark ink compositions of yellow, cyan, magenta, and black, it is more preferable to use an ink set comprising in combination five dark ink compositions of yellow, cyan, magenta, black, and white and at least one ink composition of the present invention, and it is yet more preferable to use an ink set comprising in combination five dark ink compositions of yellow, cyan, magenta, black, and white and two, that is, light cyan, and light magenta ink compositions.

The 'dark ink composition' referred to in the present invention means an ink composition for which the content of the colorant exceeds 1 wt % of the entire ink composition. The colorant is not particularly limited; a known colorant may be used, and examples thereof include a pigment and an oil-soluble dye.

The dark ink composition and the light ink composition employ colorants of similar colors, the ratio of the colorant concentration of the dark ink composition to the colorant concentration of the light ink composition is preferably dark ink composition:light ink composition=15:1 to 4:1, more preferably 12:1 to 4:1, and yet more preferably 10:1 to 4.5:1. When the ratio is in the above-mentioned range, a vivid full color image with little feeling of grain can be obtained.

Molding of Printed Material

The printed material formed using the ink composition of the present invention is suitable for molding. The process of present invention comprises a step of molding the printed material. As molding suitably employed in the present invention, embossing, vacuum forming, pressure forming, or vacuum/pressure forming may be employed.

As a system for molding a printed material, a known system may be used, and the system may be integral with the inkjet recording system or separate therefrom.

Embossing

Embossing is a process in which a three-dimensional feel is given by indenting a printed material, etc. in a desired shape such as a pattern or a letter, and may be carried out using a roller, a press, etc.

Examples of embossing include a hot/cold pressing method, and a method described in JP-A-10-199360, etc. may be referred to.

One example of an embossing system employing the hot/cold pressing method is shown below.

In the embossing system, a lower platen and an upper platen are disposed so that they can move toward and away from each other. A plate-shaped heater is fixed on top of the lower platen, and a plate-shaped heater is also fixed to a lower face of the upper platen. This enables a support to be hot pressed while it is heated. In this hot pressing machine, the plate-shaped heater on the lower platen is equipped with a mold having a projection following a predetermined embossing shape, and a mold having a recess that conforms to the shape of the projection is mounted so as to be in contact with the heater fixed to the lower face of the upper platen. A support-having an image formed thereon is positioned, a cushion sheet is placed between the support and the mold with the recess, and the support and the cushion sheet are pressed between the upper platen and the lower platen by lowering the upper platen, etc. A pressure applied in this hot pressing step is, for example; 30 tons, and the heating temperature from the plate-shaped heater is, for example, 170° C. The upper platen is pressed against the lower platen, the support and the cushion sheet are sandwiched between the molds, and this hot pressing is maintained for about 3 minutes. The support is heated by the heaters via the molds, and a plurality of projections are formed due to thermal deformation. Subsequently, the support and the cushion sheet sandwiched between the molds are subjected to cold pressing by placing them between internally water-cooled platens without heaters and applying a pressure of, for example, 30 tones by pressing the platens for about 3 minutes. This enables an embossed molded printed material to be obtained in which the support has a projecting shape due to thermal deformation by the hot pressing. The pressure applied and the heating temperature may be adjusted appropriately according to the material of the printed material and conditions such as the shape that is to be formed, etc.

When the printed material formed using the ink composition of the present invention is molded, it is preferable to carry out embossing at 20° C. to 150° C., more preferably 20° C. to 100° C., and particularly preferably 25° C. to 60° C. In the above-mentioned range, it is possible to carry out processing in which there is little change in the color of the image and release from a mold is excellent.

Vacuum Forming, Pressure Forming, and Vacuum/Pressure Forming

Vacuum forming is a method in which a support having an image formed thereon is preheated to a temperature at which it can be thermally deformed, and molding is carried out by pressing it against a mold and cooling while sucking it toward the mold by means of vacuum and stretching it; pressure forming is a method in which a support having an image formed thereon is preheated to a temperature at which it can be thermally deformed, and molding is carried out by pressing it against a mold by applying pressure from the side opposite to the mold and cooling. Vacuum/pressure forming is a method in which molding is carried out by applying a vacuum and pressure at the same time.

In detail, the 'Thermal Molding' section described on p. 766 to 768 of 'Kobunshi Daijiten' (Polymer Dictionary) (Maruzen) and publications cited in the section may be referred to. The processing temperature is appropriately selected depending on the type, etc. of the support, and it is preferable to carry out molding when the support temperature is 60° C. to 180° C., more preferably 80° C. to 160° C., and yet more preferably 80° C. to 150° C. In the above-mentioned range, it is possible to carry out processing in which there is little change in the color of the image and release from a mold is excellent.

In accordance with the present invention, there can be provided an ink composition that has excellent curability and gives an image having excellent flexibility and anti-blocking properties, and an inkjet recording method, a printed material, and a process for producing a molded printed material employing the ink composition.

EXAMPLES

The present invention is explained in further detail by reference to Examples and Comparative Examples. However, the present invention should not be construed as being limited to these Examples.

'Parts' described below means 'parts by weight' unless otherwise specified.

Starting materials of the ink composition (radically polymerizable composition) used in the present invention are as follows.

IRGALITE BLUE GLVO (cyan pigment, manufactured by Ciba Specialty Chemicals)

CINQUASIA Magenta RT-335-D (magenta pigment, manufactured by Ciba Specialty Chemicals)

NOVOPERM YELLOW H2G (yellow pigment, manufactured by Clariant)

SPECIAL BLACK 250 (black pigment, manufactured by Ciba Specialty Chemicals)

Tipaque CR-60-2 (white pigment, manufactured by Ishihara Sangyo Kaisha Ltd.)

N-Vinylcaprolactam (NVC, manufactured by BASF)

FA-513A (dicyclopentanyl acrylate, manufactured by Hitachi Chemical Co., Ltd.)

SR 9003 (propylene glycol-modified neopentyl glycol diacrylate, manufactured by Sartomer Company Inc.)

SR 506 (isobornyl acrylate, manufactured by Sartomer Company Inc.)

Solsperse 36000 (dispersant, manufactured by Noveon)

Disper BYK-168 (BYK168, polymeric dispersant, solids content 30%, manufactured by BYK Chemie)

NK ester AMP-10G (NK AMP-10G, PEA (phenoxyethyl acrylate), manufactured by Shin-Nakamura Chemical Co., Ltd.)

Rapi-Cure DVE-3 (DVE-3, triethylene glycol divinyl ether, manufactured by ISP Europe)

FIRSTCURE ST-1 (polymerization inhibitor, manufactured by ChemFirst)

IRGACURE 819 (polymerization initiator (bis(2,4,6-trimethylbenzoyl)phenylphosphine oxide), manufactured by Ciba Specialty Chemicals)

IRGACURE 184 (polymerization initiator (1-hydroxycyclohexyl phenyl ketone), manufactured by Ciba Specialty Chemicals)

Darocur TPO (polymerization initiator (2,4,6-trimethylbenzoyldiphenylphosphine oxide), manufactured by Ciba Specialty Chemicals)

Benzophenone (photoinitiator, manufactured by Wako Pure Chemical Industries, Ltd.)

R-1620 (fluorine monomer, manufactured by Daikin Industries Ltd.)

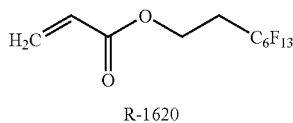

R-1620

Synthesis of Polymer FRP-3

A 5 L capacity reactor was charged with the components below, and a reaction was carried out at 75° C. for 12 hours while stirring under a nitrogen atmosphere, thus giving a polymer solution.

| | |
|---|---|
| Methyl ethyl ketone (MEK) | 350 g |
| 2-(2-Bromoisobutyryloxy)ethyl methacrylate (BBEM, molecular weight 279, manufactured by MANAC Incorporated) (0.85 mol) | 237 g |
| 2-(Perfluorohexyl)ethyl methacrylate (M-1620, molecular weight 432, manufactured by Daikin Industries Ltd.) (0.15 mol) | 64.8 g |
| Dimethyl-2,2'-azobis(2-methyl propionate) (V-601, polymerization initiator, manufactured by Wako Pure Chemical Industries, Ltd.) (0.25 mol %) | 0.68 g |

350 g of MEK (methyl ethyl ketone) and 300 g of 1,8-diazabicyclo[5.4.0]undecene-7 (DBU) were added to a system containing the polymer thus obtained and stirring was carried out at room temperature for 12 hours; a solution thus obtained was neutralized with trifluoromethanesulfonic acid, purified by reprecipitation from water, and vacuum-dried, thus giving polymer FRP-3 (295 g). The weight-average molecular weight of polymer FRP-3 was 25,000.

Synthesis of Polymer FRP-5

A 5 L capacity reactor was charged with the components below, and a reaction was carried out at 75° C. for 12 hours while stirring under a nitrogen atmosphere, thus giving a polymer solution.

| | |
|---|---|
| Methyl ethyl ketone (MEK) | 350 g |
| 2-(2-Bromoisobutyryloxy)ethyl methacrylate (BBEM, molecular weight 279, manufactured by MANAC Incorporated) (0.85 mol) | 223 g |
| 2-(Perfluorobutyl)ethyl methacrylate (M-1420, molecular weight 332, manufactured by Daikin Industries Ltd.) (0.15 mol) | 49.8 g |
| Dimethyl-2,2'-azobis(2-methyl propionate) (V-601, polymerization initiator, manufactured by Wako Pure Chemical Industries, Ltd.) (0.25 mol %) | 0.68 g |

350 g of MEK (methyl ethyl ketone) and 300 g of 1,8-diazabicyclo[5.4.0]undecene-7 (DBU) were added to a system containing the polymer thus obtained and stirring was carried out at room temperature for 12 hours; a solution thus obtained was neutralized with trifluoromethanesulfonic acid, purified by reprecipitation from water, and vacuum-dried, thus giving polymer FRP-5 (260 g). The weight-average molecular weight of polymer FRP-5 was 20,000.

Synthesis of Polymer FRP-8

A 5 L capacity reactor was charged with the components below, and a reaction was carried out at 75° C. for 12 hours while stirring under a nitrogen atmosphere, thus giving a polymer solution.

| | |
|---|---|
| Methyl ethyl ketone (MEK) | 350 g |
| 2-(2-Bromoisobutyryloxy)ethyl methacrylate (BBEM, molecular weight 279, manufactured by MANAC Incorporated) (0.35 mol) | 97.7 g |
| 2-(Perfluorohexyl)ethyl methacrylate (M-1620, molecular weight 432, manufactured by Daikin Industries Ltd.) (0.15 mol) | 64.8 g |
| Isopropyl methacrylate (molecular weight 128) (0.5 mol) | 64 g |
| Dimethyl-2,2'-azobis(2-methyl propionate) (V-601, polymerization initiator, manufactured by Wako Pure Chemical Industries, Ltd.) (0.25 mol %) | 0.68 g |

350 g of MEK (methyl ethyl ketone) and 300 g of 1,8-diazabicyclo[5.4.0]undecene-7 (DBU) were added to a system containing the polymer thus obtained and stirring was carried out at room temperature for 12 hours; a solution thus obtained was neutralized with trifluoromethanesulfonic acid, purified by reprecipitation from water, and vacuum-dried, thus giving polymer FRP-8 (201 g). The weight-average molecular weight of polymer FRP-8 was 50,000.

Synthesis of Polymer FP-4

A 5 L capacity reactor was charged with the components below, and a reaction was carried out at 75° C. for 12 hours while stirring under a nitrogen atmosphere, thus giving a polymer solution.

| | |
|---|---|
| Methyl ethyl ketone (MEK) | 350 g |
| 2-(Perfluorohexyl)ethyl methacrylate (M-1620, molecular weight 432, manufactured by Daikin Industries Ltd.) (0.15 mol) | 64.8 g |
| Cyclohexyl methacrylate (molecular weight 168) (0.85 mol) | 143 g |
| Dimethyl-2,2'-azobis(2-methyl propionate) (V-601, polymerization initiator, manufactured by Wako Pure Chemical Industries, Ltd.) (0.25 mol %) | 0.68 g |

350 g of MEK and 300 g of 1,8-diazabicyclo[5.4.0]undecene-7 (DBU) were added to a system containing the polymer thus obtained and stirring was carried out at room temperature for 12 hours; a solution thus obtained was neutralized with trifluoromethanesulfonic acid, purified by reprecipitation from water, and vacuum-dried, thus giving polymer FP-4 (198 g). The weight-average molecular weight of polymer FP-4 was 28,000.

Preparation of Cyan Mill Base A 300 parts by weight of IRGALITE BLUE GLVO, 500 parts by weight of NK ESTER AMP-10G, and 200 parts by weight of BYK168 were stirred and mixed to give cyan mill base A. Preparation of cyan mill base A was carried out by putting it into an M50 disperser motor mill (manufactured by Eiger) and dispersing using zirconia beads having a diameter of 0.65 mm at a peripheral speed of 9 m/s for 4 hours.

Preparation of Magenta Mill Base B 300 parts by weight of CINQUASIA MAGENTA RT-335 D, 400 parts by weight of NK ESTER AMP-10G, and 300 parts by weight of BYK168 were stirred and mixed to give magenta mill base B. Preparation of magenta mill base B was carried out by putting it into an M50 disperser motor mill (manufactured by Eiger) and dispersing using zirconia beads having a diameter of 0.65 mm at a peripheral speed of 9 m/s for 8 hours.

Preparation of Yellow Mill Base C 300 parts by weight of NOVOPERM YELLOW H2G, 400 parts by weight of NK ESTER AMP-10G, and 300 parts by weight of BYK168 were stirred and mixed to give yellow mill base C. Preparation of yellow mill base C was carried out by putting it into an M50 disperser motor mill (manufactured by Eiger) and dispersing using zirconia beads having a diameter of 0.65 mm at a peripheral speed of 9 m/s for 8 hours.

Preparation of Black Mill Base D 300 parts by weight of SPECIAL BLACK 250, 400 parts by weight of NK ESTER AMP-10G, and 300 parts by weight of BYK168 were stirred and mixed to give black mill base D. Preparation of black mill base D was carried out by putting it into an M50 disperser motor mill (manufactured by Eiger) and dispersing using zirconia beads having a diameter of 0.65 mm at a peripheral speed of 9 m/s for 6 hours.

Preparation of White Mill Base E 500 parts by weight of Tipaque CR60-2, 450 parts by weight of NK ESTER AMP-10G, and 50 parts by weight of Solsperse 36000 were stirred and mixed to give white mill base E. Preparation of white mill base E was carried out by putting it into an M50 disperser motor mill (manufactured by Eiger) and dispersing using zirconia beads having a diameter of 0.65 mm at a peripheral speed of 9 m/s for 3 hours.

Inkjet Image Recording Method

Subsequently, recording was carried out on a recording medium using an experimental inkjet recording device having a piezo type inkjet nozzle. The ink supply system comprised a main tank, a supply pipe, an ink supply tank immediately before an inkjet head, a filter, and a piezo type inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 45° C.±2° C. The piezo type inkjet head was driven so as to discharge multisize dots of 8 to 30 pL at a resolution of 720×720 dpi. The exposure system, the main scanning speed, and the discharge frequency were adjusted so that, after landing, UV light was focused to give an exposure area illumination intensity of 1,630 mW/cm$^2$, and irradiation started 0.1 sec. after the ink landed on the recording medium. The cumulative amount of light applied to an image was adjusted so as to be 1,000 mJ/cm$^2$. The UV lamp employed a HAN250NL high-cure mercury lamp (manufactured by GS Yuasa Corporation). Here, dpi referred to in the present invention denotes the number of dots per 2.54 cm. The recording medium employed an E5000 ester film (film thickness 125 μm, manufactured by Toyobo Co., Ltd.).

Method for Measuring Curing Sensitivity

In accordance with the above-mentioned inkjet recording method, a solid printed image having an average film thickness of 12 μm was formed, and the stickiness of the image was evaluated by touch after the image was irradiated with ultraviolet rays.

The curing sensitivity was evaluated using the following criteria.

3: No stickiness on image.

2: Image was slightly sticky.

1: Uncured ink was transferred to the hand.

Method for Measuring Anti-Blocking Properties

In accordance with the above-mentioned inkjet recording method, a solid image having an average coating thickness of 12 μm was drawn, an unprinted E5000 ester film was then superimposed on the top of the cured coating so that the entire cured coating of the printed material was covered, a load of 0.200 g/cm$^2$ was applied from above, and it was left to stand in an atmosphere of 30° C. for one day.

Anti-blocking properties were evaluated using the following criteria.

4: no transfer or sticking to the upper film.

3: transfer to the upper film was less than 1% of the entire film area.

2: transfer to the upper film was at least 1% but no greater than 5% of the entire film area.

1: transfer to the upper film was 5% or greater of the entire film area.

Method for Evaluating Flexibility: Bending Test

In the Examples, as a method for evaluating the flexibility of a cured film, a bending test was carried out.

In accordance with the above-mentioned inkjet image recording method, an E5000 ester film (film thickness 125 μm, manufactured by Toyobo Co., Ltd.) was used as a recording medium, and three solid printed images having average image area film thicknesses of 12 μm, 24 μm, and 36 μm were formed. The bending test involved bending once at 25° C. the recording medium on which an image had been formed, and an evaluation was carried out of the presence or absence of cracks in the image area. In general, when the average film thickness was large, the distortion occurring in the image area when bending the image area became large, and cracks easily occurred. That is, testing whether or not cracks occurred in an image area having a larger film thickness gave a measure of the flexibility.

The evaluation criteria were as follows.

4: No cracks occurred at all in the bent portion of an image area for samples having average film thicknesses of 12 μm, 24 μm, and 36 μm.

3: No cracks occurred for samples having average film thicknesses of 12 μm and 24 μm, but cracks occurred in the bent portion of an image area of a sample having an average film thickness of 36 μm.

2: No cracks occurred for a sample having an average film thickness of 12 μm, but cracks occurred in the bent portion of an image area of samples having average film thicknesses of 24 μm and 36 μm.

1: Cracks occurred in the bent portion of an image area for all samples having average film thicknesses of 12 μm, 24 μm, and 36 μm.

Vacuum Forming Test

Vacuum Forming Process Test

A printed material was formed by the same method as above except that Panlite PC-1151 (film thickness 500 μm, polycarbonate sheet, manufactured by Teijin Chemicals Ltd.) was used as a support, and this printed material was then subjected to vacuum forming using a Forming 300X vacuum forming system (manufactured by Seiko Sangyo Co., Ltd.). A wooden mold shown in FIG. 1 was placed at the center of a vacuum table of the vacuum forming system, after the support temperature reached 130° C. to 150° C. the vacuum table on which the wooden mold was placed was slowly raised while operating a table raise/lower lever, and vacuum forming was carried out. The molded printed material was visually examined for the occurrence of cracking and pinholes.

Evaluation of Image Stripe Unevenness

The image drawn by the inkjet recording method above was evaluated visually for stripe unevenness in the inkjet head operation direction.

Method for Measuring Viscosity

Measurement of viscosity in the Examples was carried out using a Brookfield LVDV-I type B viscometer (manufactured by Brookfield) at 25° C. with a rotor rotational speed of 20 rpm.

Method for Measuring Particle Size

In the present Examples, particle size was measured using an FPAR-1000 (manufactured by Otsuka Electronics Co., Ltd.). When measuring, OXT-221 was used as a diluent solvent in order to adjust the concentration.

Method for Testing Scratch Resistance (Pencil Hardness)

A test was carried out in accordance with the JIS Handbook: Paint (Japan Standards Association). As equipment, a Heidon HHS2000 (Shinto Scientific Co., Ltd) was used, and it was operated at 20 mm with a weight of 750 g and an operating speed of 0.2 mm/sec.

Preparation of Ink

An ink composition was obtained by mixing starting materials in a stirrer. The formulations and the evaluation results are given in Tables 1 to 4.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| | | | | | Color | | | |
| | | Cyan | Magenta | Black | Yellow | White | Light cyan | Light magenta |
| Pigment dispersion (parts by weight) | Cyan mill base A | 6 | — | — | — | — | 1 | — |
| | Magenta mill base B | — | 12 | — | — | — | — | 2.3 |
| | Black mill base D | — | — | 6 | — | — | — | — |
| | Yellow mill base C | — | — | — | 12 | — | — | — |
| | White mill base E | — | — | — | — | 30 | — | — |
| Monofunctional monomer (parts by weight) | N-Vinylcaprolactam | 26 | 24 | 26 | 24 | 22 | 27.5 | 27 |
| | NK AMP-10G (Phenoxyethyl acrylate) | 54 | 51 | 54 | 51 | 30.8 | 56.8 | 56 |
| Polyfunctional monomer (parts by weight) | DVE-3 (Triethylene glycol divinyl ether) | 4 | 3 | 4 | 3 | 3 | 4.7 | 4.7 |
| Polymerization initiator (parts by weight) | Irgacure 819 | 4.5 | 4.5 | 4.5 | 4.5 | — | 4.5 | 4.5 |
| | Darocur TPO | — | — | — | — | 8.9 | — | — |
| | Irgacure 184 | — | — | — | — | 1.8 | — | — |
| | Benzophenone | 3.2 | 3.2 | 3.2 | 3.2 | 1.2 | 3.2 | 3.2 |
| Polymerization inhibitor (parts by weight) | FIRSTCURE ST-1 | 0.3 | 0.3 | 0.3 | 0.3 | 0.3 | 0.3 | 0.3 |
| Fluorine polymer (parts by weight) | Compound Example [FRP-3] | 2 | 2 | 2 | 2 | 2 | 2 | 2 |
| Total amount of monofunctional monomer (in ink composition) [wt %] | | 83 | 79.8 | 83 | 79.8 | 66.3 | 84.8 | 83.92 |
| Total amount of polyfunctional monomer (in ink composition) [wt %] | | 4 | 3 | 4 | 3 | 3 | 4.7 | 4.7 |
| Monofunctional monomer ratio (relative to total amount of monomer) [wt %] | | 95 | 96 | 95 | 96 | 96 | 95 | 95 |
| Viscosity [cP] | | 17.5 | 18.5 | 18.7 | 17.6 | 19.6 | 16.2 | 16.8 |
| Surface tension [mN/m] | | 26.5 | 26.3 | 26.2 | 26.3 | 26.4 | 26.3 | 26.3 |
| Curability | | 3 | 3 | 3 | 3 | 3 | 3 | 3 |
| Anti-blocking properties | | 4 | 4 | 4 | 4 | 4 | 4 | 4 |
| Flexibility | | 4 | 4 | 4 | 4 | 4 | 4 | 4 |
| Vacuum forming test | | Good | Good | Good | Good | Good | Good | Good |
| Image stripe unevenness | | Good | Good | Good | Good | Good | Good | Good |
| Scratch resistance (pencil hardness) | | 2H | 2H | 2H | 2H | 2H | 3H | 2H |

TABLE 2

| | | Ex. 5 | Ex. 8 | Ex. 9 | Ex. 10 | Ex. 11 | Ex. 12 |
|---|---|---|---|---|---|---|---|
| | | | | | Color | | |
| | | White | White | White | White | White | White |
| Pigment dispersion (parts by weight) | White mill base E | 30 | 30 | 30 | 30 | 30 | 30 |
| Monofunctional monomer (parts by weight) | N-Vinylcaprolactam | 22 | 22 | 22 | 22 | 22 | 22 |
| | NK AMP-10G (Phenoxyethyl | 30.8 | 30.8 | 30.8 | 30.8 | 4.8 | 4.8 |

TABLE 2-continued

|  |  | Ex. 5 | Ex. 8 | Ex. 9 | Ex. 10 | Ex. 11 | Ex. 12 |
|---|---|---|---|---|---|---|---|
|  |  |  |  |  | Color |  |  |
|  |  | White | White | White | White | White | White |
|  | acrylate) |  |  |  |  |  |  |
|  | SR506 (Isobornyl acrylate) | — | — | — | — | 26 | — |
|  | FA513A (Dicyclopentanyl acrylate) | — | — | — | — | — | 26 |
| Polyfunctional monomer (parts by weight) | DVE-3 (Triethylene glycol divinyl ether) | 3 | 3 | 3 | 3 | 3 | 3 |
| Polymerization initiator (parts by weight) | Darocur TPO | 8.9 | 8.9 | 8.9 | 8.9 | 8.9 | 8.9 |
|  | Irgacure 184 | 1.8 | 1.8 | 1.8 | 1.8 | 1.8 | 1.8 |
|  | Benzophenone | 1.2 | 1.2 | 1.2 | 1.2 | 1.2 | 1.2 |
| Polymerization inhibitor (parts by weight) | FIRSTCURE ST-1 | 0.3 | 0.3 | 0.3 | 0.3 | 0.3 | 0.3 |
| Fluorine polymer (parts by weight) | Compound Example [FRP-3] | 2 | — | — | — | 2 | 2 |
|  | Compound Example [FRP-5] | — | 2 | — | — | — | — |
|  | Compound Example [FRP-8] | — | — | 2 | — | — | — |
|  | Compound Example [FP-4] | — | — | — | 2 | — | — |
| Total amount of monofunctional monomer (in ink composition) [wt %] |  | 66.3 | 66.3 | 66.3 | 66.3 | 66.3 | 66.3 |
| Total amount of polyfunctional monomer (in ink composition) [wt %] |  | 3 | 3 | 3 | 3 | 3 | 3 |
| Monofunctional monomer ratio (relative to total amount of monomer) [wt %] |  | 96 | 96 | 96 | 96 | 96 | 96 |
| Ink viscosity [cP] |  | 19.6 | 17.5 | 16.4 | 16.5 | 19.1 | 20.9 |
| Ink surface tension [mN/m] |  | 26.4 | 25.4 | 28.3 | 24.2 | 26.3 | 26.2 |
| Curability |  | 3 | 3 | 3 | 3 | 3 | 3 |
| Anti-blocking properties |  | 4 | 4 | 3 | 3 | 4 | 4 |
| Flexibility |  | 4 | 4 | 4 | 4 | 4 | 4 |
| Vacuum forming test |  | Good | Good | Good | Printed material slightly stuck to mold, hard to remove, no cured coating transfer to mold, molding could be isolated. | Good | Good |
| Image stripe unevenness |  | Good | Good | Good | Stripe unevenness obvious only when compared with sample of Ex. 1. | Good | Good |
| Scratch resistance (pencil hardness) |  | 2H | 2H | H | B | 2H | 2H |

TABLE 3

|  |  | Ex. 14 | Ex. 15 | Ex. 5 | Ex. 16 | Ex. 17 | Ex. 18 | Ex. 19 |
|---|---|---|---|---|---|---|---|---|
|  |  |  |  |  | Color |  |  |  |
|  |  | White | White | White | White | White | White | White |
| Pigment dispersion (parts by weight) | White mill base E | 30 | 30 | 30 | 30 | 30 | 30 | 30 |
| Monofunctional monomer (parts by weight) | N-Vinylcaprolactam | 19 | 21 | 22 | 22 | 22.1 | 22.3 | 22.4 |
|  | NK AMP-10G (Phenoxyethyl acrylate) | 25.8 | 28.8 | 30.8 | 31.8 | 31.9 | 32 | 32.1 |
| Polyfunctional monomer (parts by weight) | DVE-3 (Triethylene glycol divinyl ether) | 3 | 3 | 3 | 3 | 3 | 3 | 3 |
| Polymerization initiator (parts by weight) | Darocur TPO | 8.9 | 8.9 | 8.9 | 8.9 | 8.9 | 8.9 | 8.9 |
|  | Irgacure 184 | 1.8 | 1.8 | 1.8 | 1.8 | 1.8 | 1.8 | 1.8 |
|  | Benzophenone | 1.2 | 1.2 | 1.2 | 1.2 | 1.2 | 1.2 | 1.2 |
| Polymerization inhibitor (parts by weight) | FIRSTCURE ST-1 | 0.3 | 0.3 | 0.3 | 0.3 | 0.3 | 0.3 | 0.3 |

TABLE 3-continued

|  |  | Ex. 14 | Ex. 15 | Ex. 5 | Ex. 16 | Ex. 17 | Ex. 18 | Ex. 19 |
|---|---|---|---|---|---|---|---|---|
|  |  |  |  | Color |  |  |  |  |
|  |  | White | White | White | White | White | White | White |
| Fluorine polymer (parts by weight) | Compound Example [FRP-3] | 10 | 5 | 2 | 1 | 0.8 | 0.5 | 0.3 |
| Total amount of monofunctional monomer (in ink composition) [wt %] | | 58.3 | 63.3 | 66.3 | 67.3 | 67.5 | 67.8 | 68 |
| Total amount of polyfunctional monomer (in ink composition) [wt %] | | 3 | 3 | 3 | 3 | 3 | 3 | 3 |
| Monofunctional monomer ratio (relative to total amount of monomer) [wt %] | | 95 | 95 | 96 | 96 | 96 | 96 | 96 |
| Viscosity [cP] | | 24.6 | 22.3 | 19.6 | 18.2 | 18 | 17.9 | 17.8 |
| Surface tension [mN/m] | | 23.1 | 24.3 | 26.4 | 26.7 | 27 | 27.3 | 27.6 |
| Curability | | 3 | 3 | 3 | 3 | 3 | 3 | 3 |
| Anti-blocking properties | | 4 | 4 | 4 | 4 | 4 | 3 | 3 |
| Flexibility | | 3 | 4 | 4 | 4 | 4 | 4 | 4 |
| Vacuum forming test | | Slightly cracked in edge portion, but overall good molding obtained. | Good | Good | Good | Good | Good | Printed material slightly stuck to mold, hard to remove, no cured coating transfer to mold, molding could be isolated. |
| Image stripe unevenness | | Good | Good | Good | Good | Good | Good | Good |
| Scratch resistance (pencil hardness) | | 5H | 3H | 2H | 2H | B | B | 2B |

TABLE 4

|  |  | Ex. 5 | Ex. 21 | Ex. 22 | Comp. Ex. 1 | Comp. Ex. 2 | Comp. Ex. 3 | Comp. Ex. 4 | Comp. Ex. 5 |
|---|---|---|---|---|---|---|---|---|---|
|  |  |  |  |  | Color |  |  |  |  |
|  |  | White | White | White | White | White | White | White | White |
| Pigment dispersion (parts by weight) | White mill base E | 30 | 30 | 30 | 30 | 30 | 30 | 30 | 30 |
| Monofunctional monomer (parts by weight) | N-Vinylcaprolactam | 22 | 21.5 | 20.5 | 17 | 16 | 14 | 22.5 | 22 |
|  | NK AMP-10G (Phenoxyethyl acrylate) | 33.8 | 29.3 | 27.3 | 23.8 | 21.8 | 18.8 | 32.3 | 30.8 |
| Polyfunctional monomer (parts by weight) | DVE-3 (Triethylene glycol divinyl ether) | 3 | 3 | 3 | 3 | 3 | 3 | 3 | 3 |
|  | SR9003 (PPG-modified pentyl glycol diacrylate) | — | 2 | 5 | 12 | 15 | 20 | — | — |
| Polymerization initiator (parts by weight) | Darocur TPO | 8.9 | 8.9 | 8.9 | 8.9 | 8.9 | 8.9 | 8.9 | 8.9 |
|  | Irgacure 184 | 1.8 | 1.8 | 1.8 | 1.8 | 1.8 | 1.8 | 1.8 | 1.8 |
|  | Benzophenone | 1.2 | 1.2 | 1.2 | 1.2 | 1.2 | 1.2 | 1.2 | 1.2 |
| Polymerization inhibitor (parts by weight) | FIRSTCURE ST-1 | 0.3 | 0.3 | 0.3 | 0.3 | 0.3 | 0.3 | 0.3 | 0.3 |
| Fluorine polymer (parts by weight) | Compound Example [FRP-3] | 2 | 2 | 2 | 2 | 2 | 2 | — | — |
| Fluorine monomer (parts by weight) | R1620 | — | — | — | — | — | — | — | 2 |
| Total amount of monofunctional monomer (in ink composition) [wt %] | | 66.3 | 64.3 | 61.3 | 54.3 | 51.3 | 46.3 | 68.3 | 66.3 |
| Total amount of polyfunctional monomer (in ink composition) [wt %] | | 3 | 5 | 8 | 15 | 18 | 23 | 3 | 3 |

TABLE 4-continued

| | Ex. 5 | Ex. 21 | Ex. 22 | Comp. Ex. 1 | Comp. Ex. 2 | Comp. Ex. 3 | Comp. Ex. 4 | Comp. Ex. 5 |
|---|---|---|---|---|---|---|---|---|
| Color | White | White | White | White | White | White | White | White |
| Monofunctional monomer ratio (relative to total amount of monomer) [wt %] | 96 | 93 | 88 | 78 | 74 | 67 | 96 | 96 |
| Viscosity [cP] | 19.6 | 19.7 | 19.8 | 19.9 | 18.5 | 20.1 | 16.5 | 19.1 |
| Surface tension [mN/m] | 26.4 | 26.4 | 26.3 | 26.2 | 26.5 | 26.5 | 39 | 21.9 |
| Curability | 3 | 3 | 3 | 3 | 3 | 3 | 1 | 1 |
| Anti-blocking properties | 4 | 4 | 4 | 4 | 3 | 3 | 1 | 1 |
| Flexibility | 4 | 4 | 4 | 3 | 2 | 1 | 4 | 4 |
| Vacuum forming test | Good | Good | Good | Crack occurred in cured coating. | Crack occurred in cured coating. | Intense crack occurred in cured coating | Printed material slightly stuck to mold, hard to remove, no cured coating transfer to mold, molding could be isolated. | Printed material slightly stuck to mold, hard to remove, no cured coating transfer to mold, molding could be isolated. |
| Image stripe unevenness | Good | Good | Good | Good | Good | Good | Stripe unevenness obvious compared with sample of Ex. 1. | Stripe unevenness obvious compared with sample of Ex. 1. |
| Scratch resistance (pencil hardness) | 2H | 2H | 4H | 5H | 6H | 6H | 5B | 5B |

What is claimed is:

1. An ink composition comprising:
   (A) a perfluoroalkyl group-containing polymer having an ethylenically unsaturated double bond;
   (B) a polymerizable monomer; and
   (C) a radical polymerization initiator;
   at least 80 wt % of the polymerizable monomer being a monofunctional polymerizable monomer selected from the group consisting of a monofunctional acrylate, a monofunctional methacrylate, a monofunctional vinyloxy compound, a monofunctional N-vinyl compound, a monofunctional acrylamide, and a monofunctional methacrylamide.

2. The ink composition according to claim 1, wherein the perfluoroalkyl group-containing polymer has a weight-average molecular weight of at least 1,000 but no greater than 100,000.

3. The ink composition according to claim 1, wherein the perfluoroalkyl group-containing polymer has a content of at least 0.1 wt % but no greater than 5 wt % of the total ink composition.

4. The ink composition according to claim 1, wherein the perfluoroalkyl group-containing polymer is a homopolymer of a monomer represented by Formula (II) below or a copolymer with another copolymerizable monomer Formula (II)

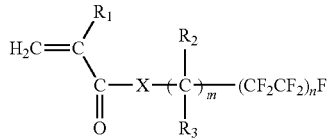

wherein $R_1$ denotes a hydrogen atom, a halogen atom, an optionally substituted methyl group, or an optionally substituted ethyl group, $R_2$ and $R_3$ independently denote a hydrogen atom or an alkyl group having 1 to 4 carbons, X denotes a single bond or a divalent linking group (organic group), m denotes an integer of 0 or greater, n denotes an integer of 1 or greater, and when m is 2 or greater, functional groups on adjacent carbons (i.e. $R_2$s or $R_3$s bonded to adjacent carbons) may be bonded to form an aliphatic ring.

5. The ink composition according to claim 1, wherein the monofunctional polymerizable monomer comprises a monomer having only one ethylenically unsaturated double bond group selected from the group consisting of an acryloyloxy group, a methacryloyloxy group, an acrylamide group, a methacrylamide group, and an N-vinyl group, and having a cyclic structure.

6. The ink composition according to claim 5, wherein the monofunctional polymerizable monomer having only one ethylenically unsaturated double bond group selected from the group consisting of an acryloyloxy group, a methacryloyloxy group, an acrylamide group, a methacrylamide group, and an N-vinyl group and having a cyclic structure has a content of at least 60 wt % of the total ink composition.

7. The ink composition according to claim 1, wherein the monofunctional N-vinyl compound is an N-vinyllactam represented by Formula (2) below (2)

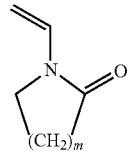

wherein m denotes an integer of 1 to 5.

8. The ink composition according to claim 1, wherein it has a viscosity at 25° C. of at least 5 mPa·s but no greater than 40 mPa·s.

9. The ink composition according to claim 1, wherein it is intended for use in inkjet recording.

10. An inkjet recording method comprising:
   ($a^1$) a step of discharging the ink composition according to claim 1 onto a recording medium; and
   ($b^1$) a step of curing the ink composition by irradiating the discharged ink composition with actinic radiation.

11. The inkjet recording method according to claim 10, wherein the actinic radiation has a peak wavelength of at least 200 nm but no greater than 600 nm.

12. A printed material obtained by the inkjet recording method according to claim 10.

13. A process for producing a molded printed material comprising:
   ($a^2$) a step of forming an image by discharging the ink composition according to claim 1 onto a support by an inkjet method;
   ($b^2$) a step of irradiating the image thus obtained with actinic radiation so as to cure the ink composition and obtain a printed material having the image cured on the support; and
   ($c^2$) a step of molding the printed material.

14. The process for producing a molded printed material according to claim 13, wherein the molding step is selected from the group consisting of an embossing step, a vacuum forming step, a pressure forming step, and a vacuum/pressure forming step.

* * * * *